Oct. 27, 1959

F. B. BELLON 2,909,846

QUADRANTAL AND SEMI-CIRCULAR DEVIATION CORRECTORS

Filed May 25, 1954

INVENTOR:
FRANCOIS BAPTISTIN BELLON

BY
Richardson, David and Verdon
ATTORNEYS.

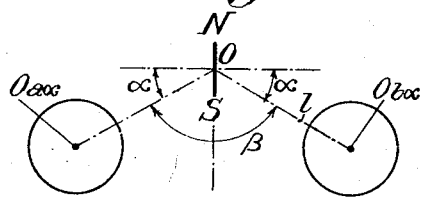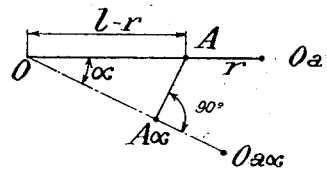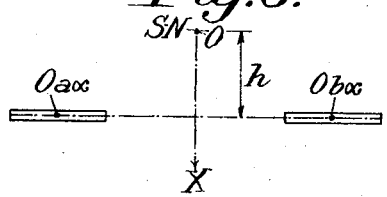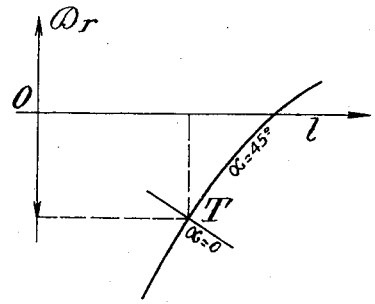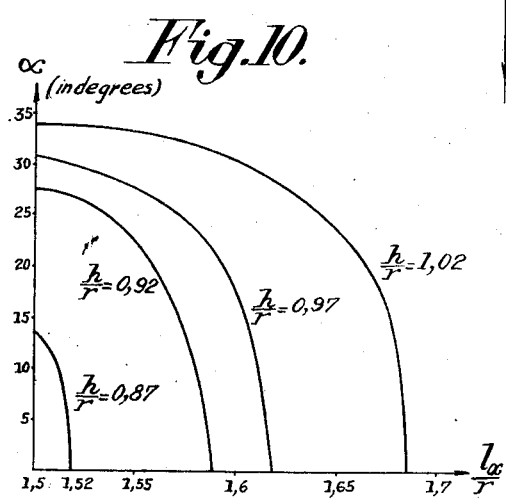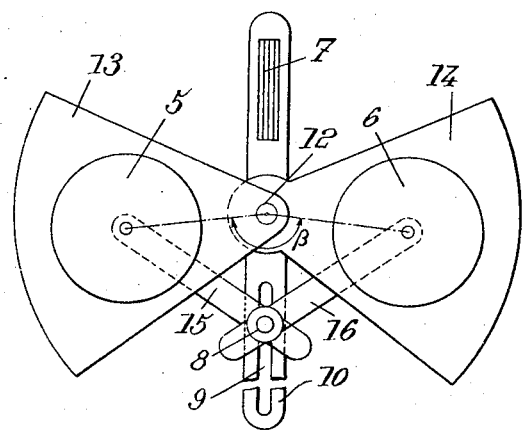

Oct. 27, 1959    F. B. BELLON    2,909,846
QUADRANTAL AND SEMI-CIRCULAR DEVIATION CORRECTORS
Filed May 25, 1954    3 Sheets-Sheet 3
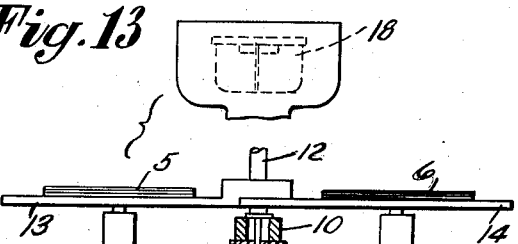
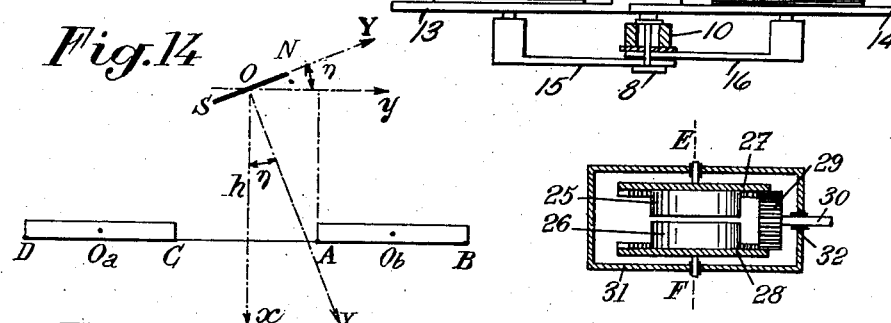
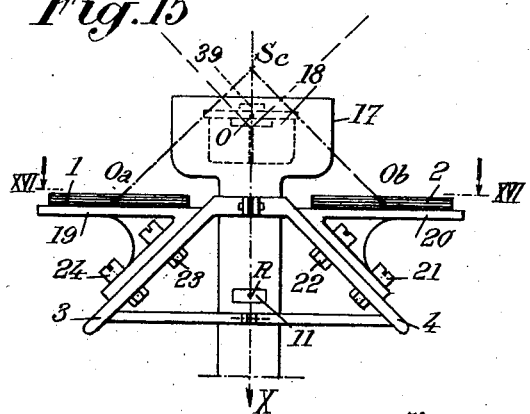
INVENTOR:
FRANÇOIS BAPTISTIN BELLON
BY
Richardson, David and Nordon
ATTORNEYS.

2,909,846
QUADRANTAL AND SEMI-CIRCULAR DEVIATION CORRECTORS

François Baptistin Bellon, Paris, France

Application May 25, 1954, Serial No. 432,268

Claims priority, application France May 30, 1953

8 Claims. (Cl. 33—225)

The present invention relates to apparatus sensitive to the earth's magnetic field and which will be hereinafter called "magnetic compass apparatus" (for instance north indicating apparatus, course transmitting apparatus, path of travel recorders, automatic pilots, and so on) having at least one quadrantal or semi-circular corrector, and it is more especially concerned with magnetic compasses.

Before stating the essential feature of my invention I will give some explanations and definitions concerning this kind of apparatus.

Since the works of Archibald Smith it has been known that the horizontal component $\vec{H'}$ of the magnetic field at a point of a vehicle (ship, aircraft, land vehicle) can be represented in imaginary notation by the following formula (the reference axis coinciding with the horizontal component $\vec{H}$ of the earth's magnetic field, the reference direction for measuring angles being the clockwise direction, a vector parallel to $\vec{H}$ being represented by a real number and a vector at right angles to $\vec{H}$ being represented by an imaginary number):

$$H'e^{i\delta} = \lambda H[1 + i\mathscr{A} + (\mathscr{B} + i\mathscr{C})e^{i\theta} + (\mathscr{D} + i\mathscr{E})e^{2i\theta}]$$

In this formula:

$H'$ is the absolute value of the horizontal component $\vec{H'}$ of the magnetic field existing at the place where the compass is positioned;

$H$ is the absolute value of the horizontal component $\vec{H}$ of the earth's field at the place where the vehicle is located, in the absence of this vehicle;

$\delta$ is the angle made by $\vec{H'}$ with $\vec{H}$; $\delta$ is the deviation which is to be reduced to zero, or at least greatly reduced, by the compensation means;

$\lambda$, $\mathscr{A}$, $\mathscr{D}$ and $\mathscr{E}$ are constants which depend upon the distribution of the soft iron parts of the vehicle;

$\mathscr{B}$ and $\mathscr{C}$ are factors given by the formulas $$\lambda H \mathscr{B} = P + cZ; \quad \lambda H \mathscr{C} = Q + fZ$$

in which P and Q are constants which represent the action of the permanent magnetism of the vehicle; $c$ and $f$ are constants which depend upon the distribution of the soft iron parts of the vehicle; Z is the value of the vertical component of the earth's field at the place where the vehicle is located, in the absence of the vehicle;

$\theta$ is the heading of the vehicle counted positively in the clockwise direction;

$i$ is the imaginary unit, that is to say $\sqrt{-1}$; and $e$ is the base of hyperbolic or natural logarithms.

The expression $\lambda H(\mathscr{B} + i\mathscr{C})$ is called the semicircular deviation. It is generally reduced to zero either by means of magnets, or by means of the combination of magnets and vertical soft iron bars called Flinders bars.

The expression $\lambda H(\mathscr{D} + i\mathscr{E})$ represents the quadrantal deviation. It may be written in the form $Ne^{2i\psi}$ with $$N = \lambda H \sqrt{\mathscr{D}^2 + \mathscr{E}^2}$$

and $$\psi = \tfrac{1}{2} \text{ arc } tg \frac{\mathscr{E}}{\mathscr{D}}$$

Generally, this quadrantal deviation is reduced to zero by means of soft iron correcting means (spheres, ellipsoids, bars, plates, etc.) mounted on either side of the compass.

By disposing suitably near the centre of the compass these soft iron correcting means, it is possible to reduce to zero the quadrantal deviation (due to the induction of component $\vec{H}$ in the soft iron parts of the vehicle) by means of the magnetism induced in the correcting means by the same component $\vec{H}$. In this operation, the two fields which act upon the compass, i.e. that which produces the deviation and the other which compensates for it, are both proportional to component $\vec{H}$ and accordingly once the correction has been made it is correct for all points of the earth.

But this is true only when account is not taken of the magnetizing produced by the needles of the compass card in the soft iron correctors.

This condition is complied with rather closely in the Lord Kelvin dry compass due to the low magnetic moment of the system of short needles of the compass card and to the great distance at which the soft iron correctors (which are spheres having a diameter as large as 30 cm.) are located from the compass card needles.

But this condition is not complied with in wet compasses such as used at the present time due to the high magnetic moment of the magnets which constitute the sensitive element of the compass.

Likewise it is not complied with in the small size compasses that are used on board aircraft and tanks because, in order to reduce the dimensions of the soft iron correctors, it is necessary to place them close to the compass card needles which then induce into these correctors a magnetism which is far from negligible.

The induction effect of the needles of the compass card on the soft iron correctors produces a disturbing field having a pseudo-quadrantal character of the form $$N_r e^{2i(\theta' + \psi_1)}$$

in which the argument $\theta'$ is the compass heading ($\theta' = \theta - \delta$) whereas in the expression of the quadrantal field due to the ship the argument is the magnetic heading $\theta$.

$\psi_1$ is the angle made by the plane of symmetry of the correctors with the south-north direction of the needles of the compass card when $\theta' = 0$.

This disturbing field is generally much higher than that produced by the induction of the earth's field H. But this field produced by the induction effect of the needles has a constant amplitude $N_r$ (it depends upon the magnetic moment of the needles and upon the disposition of the correctors with respect to the compass card) whereas the quadrantal field proper has an amplitude N proportional to H.

So long as the correction depends upon the existence of proportionality between the deflecting fields on the one hand and the directive and corrective fields on the other hand, to maintain an invariability in the direction of the resultant, complete quadrantal correction (i.e. correction of the deviation due to the induction effects in the soft iron parts, both of the earth's field and of the compass card needles, this last mentioned effect being generally preponderating) once obtained for a given position of the vehicle, is no longer obtained when, due to movement of said vehicle, the horizontal component H has varied. In other words, the quadrantal deviation has a variable amplitude when the vehicle is moving. It is therefore necessary to readjust the quadrantal correctors as soon as the magnetic latitude of the vehicle has substantially changed.

Furthermore, as the induced pseudo-quadrantal deviation has an argument $\theta'=\theta-\delta$ instead of $\theta$, the conventional methods for readjusting compensations, in particular the deflector method of Lord Kelvin, are no longer applicable, which is another drawback of such correctors.

The necessity of readjusting the quadrantal correctors during navigation involves a difficulty which is admissible on a ship but which cannot be admitted in an aircraft due to the quick variations of magnetic latitude of such a vehicle. This is why most of the aircraft compasses are at the present time unprovided with quadrantal correctors because it is better for the navigator to have a compass which has deviations of substantial value but which do not depend upon the heading and are well known owing to the tracing of a deviation chart, than to have a compass which is well compensated for a given position of the aircraft, but in which the pseudo-quadrantal deviations have a variable amplitude during navigation.

In order to obtain quadrantal correctors the adjustment of which is good at all points, various methods have been suggested. In most of the known solutions, the deviation produced by the induction of the needles is compensated for by disposing, near the centre of the compass, correctors of different shapes which produce, under the influence of the needles, deviations of opposite signs. By suitably combining these correctors and placing them at suitable distances, it is possible to reduce to zero the deviation due to the induction of the needles. But these correctors have, among others, the disadvantage of requiring for the various possible values of the quadrantal, individual adjustments of the respective elements, which adjustments are all the more delicate as the magnetic moment of the needles of the compass card is greater and the compass is of smaller size, because the soft iron correctors are then necessarily very close to the compass card.

Another method consists in making use of correctors located in the horizontal plane of the compass card, on either side thereof, and so shaped that the needle induction has a total effect equal to zero. This method is only an approximate one because the magnetic field produced by the needles is not uniform and the shape of the corrector which introduces a truly zero induction effet is variable according to the dimension of the corrector and to its distance from the centre of the compass, that is to say according to the value of the quadrantal deviation to be corrected. Therefore it gives an acceptable solution of the problem only if the corrector is sufficiently far from the centre of the compass to make it possible to consider the field as substantially uniform inside the whole volume of the corrector. Consequently, this leads to large size apparatus.

All the known solutions have a common disadvantage which is the necessity of making use of several sets of correctors of variable volume and arrangement to cover the whole range of possible values of the quadrantal deviation.

In small size compasses, the semi-circular correctors are magnetized by the compass card magnet and produce, in addition to the useful semi-circular field, a perturbing field analogous to the field of the quadrantal correctors and of the same nature as it. The existence of this perturbing field prevents the quadrantal correction from being correct at all places.

The object of my invention is to provide an apparatus of the kind in question which is better adapted to meet the requirements of practice than those known up to now.

I will call "mean horizontal plane" of the corrector a horizontal plane fixed with respect to the corrector such that, if the centre of the compass card magnets is located in this plane, the corrector produces, under the effect of its magnetizing by the compass card magnets, a field which, at the centre of the compass, is horizontal. When the corrector has a horizontal plane of geometrical and magnetic symmetry, this plane constitutes the mean horizontal plane of the corrector.

When a corrector is placed in the vicinity of the compass, it is magnetized under the effect of the three components of the magnetic field produced by the magnets of the compass card. These magnetizing effects thus induced in the corrector in turn produce magnetic fields at the center of the compass card.

According to my invention the correctors have a mean horizontal plane which is distinct (spaced) from the horizontal plane of the compass card magnets and the relative values of the distance between said two planes and the distance between each of said correctors and the vertical pivot axis of said compass card respectively are chosen so that the deviating effects on the compass card magnets of the fields produced at the center of the compass card by the magnetizing effect induced in said correctors by the compass card magnets compensate each other in the horizontal plane of said center and therefore produce no deviation of the compass card whatever be the direction thereof with respect to said correctors.

As the induction of the compass card magnets produces no deviation in the presence of these correctors, I will hereinafter call said correctors "compensated induction correctors."

Preferred embodiments of my invention will be hereinafter described with reference to the accompanying drawings, given merely by way of example, and in which:

Figs. 1 and 2 are respectively a diagrammatic elevational view and a plan view of the respective positions of the magnets of the compass card and of a corrector element according to the invention, in three positions of this corrector element with respect to the South-North direction of the compass card magnets.

Fig. 3 diagrammatically illustrates in elevational view the magnetic fields induced in a corrector by the vertical component of the field of the compass card magnets.

Figure 5:
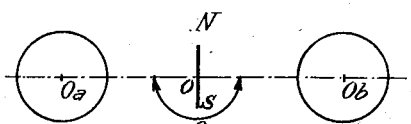
Fig. 5 is a plan view and Fig. 6 an elevational view of two correctors according to the invention disposed symmetrically with respect to the vertical OX passing through the centre of the compass, that is to say in which the vertical planes passing through OX and respectively through centres $O_a$ and $O_b$ of the correctors make with each other an angle $\beta=180°$.
Figure 6:
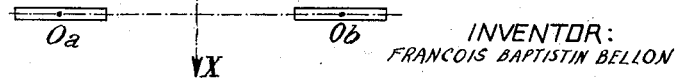

Figs. 7 and 8 show the same system as Figs. 5 and 6 in the case where $\beta$ is different from 180°.

Fig. 9 is a diagrammatical view showing the variation of the position of the centre $O_{a_a}$ of one of the correctors of Figs. 7 and 8 with $\alpha=\frac{1}{2}(180°-\beta)$ when $\beta$ varies.

Fig. 10 diagrammatically illustrates the relations between the parameters which fix the position, with respect to the centre of the compass, of correctors having the shape of bodies of revolution.

Fig. 11 diagrammatically illustrates a method for determining the position of the correctors in order to vary the value of the quadrantal correction by varying $\alpha$.

Figs. 12 and 13 show, respectively in plan view and in elevational view, a quadrantal corrector device according to a preferred embodiment of my invention.

Fig. 14 is an elevational view of the compass and of the correctors when the axis of the compass card is inclined with respect to the correctors.

Fig. 15 shows in elevational view, and Fig. 16 in horizontal view on the line XVI—XVI of Fig. 15, a compass with its housing and its quadrantal correctors made according to a modification of the invention.

Fig. 17 shows a semi-circular corrector system the position of which may be fixed with respect to the centre of the compass card.

Fig. 18 shows a hysteresis curve along which passes the point representing the magnetic induction in a quadrantal corrector when the heading of the compass varies.

Fig. 19 shows a semi-circular corrector according to my invention.

Figure 1:
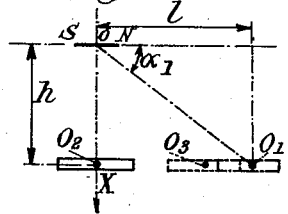
Figure 2:
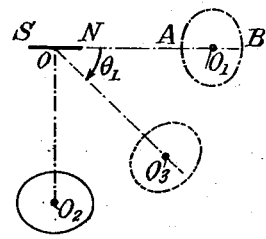

The magnetic compass according to my invention essentially includes the following elements (Figs. 1 and 2):

(a) A compass card SN fixed to a magnetic system movable about a vertical axis OX and which may be constituted either by short magnets, parallel and disposed in a suitable conventional arrangement to eliminate deviations of a higher order (sextantal, octantal, etc.) due to the proximity of the correctors, or, preferably, by a single magnet in the form of a body of revolution the magnetizing of which is uniform and at right angles to axis OX. This magnetic system will be hereinafter called "magnet";

(b) A corrector system of which I have shown an element occupying three different positions, indicated by those of its centre, $O_1$, $O_2$ and $O_3$, with respect to the South-North direction of the compass magnet. This corrector is made of a magnetic substance and it preferably has a shape or magnetic characteristics such that its apparent permeability in a direction parallel to OX is smaller than in the directions perpendicular to OX, which may be obtained for instance by making use of a flat corrector, as indicated by Figs. 1 and 2, or by giving this corrector a laminated structure, the lamination being along planes perpendicular to OX.

In practice, a corrector used according to my invention is a body symmetrical about a plane passing through the pivot axis of the compass card. This plane will be hereinafter called "vertical plane of magnetic symmetry of the corrector," provided that this body is magnetically isotropic.

If the body is not isotropic it may be magnetically symmetrical about a plane, not of geometrical symmetry thereof, passing through the pivot axis of the compass card. In this case, this plane of magnetic symmetry will also be called "vertical plane of magnetic symmetry."

But it is known in the art that, even if from a general point of view a corrector is neither geometrically nor magnetically symmetrical about one plane fixed with respect thereto, there exists a plane, fixed with respect to said corrector and hereinafter called "vertical plane of magnetic symmetry with respect to the compass card" which may be defined as follows:

The plane, fixed with respect to said corrector, which passes through the pivot axis of the compass card and is parallel to the North-South direction thereof when the corrector and the compass card are so positioned with respect to each other that the horizontal component of the field produced at the center of the compass card by the magnetizing effect induced in the corrector by the magnets of the compass card is parallel to said North-South direction.

The above mentioned "vertical plane of magnetic symmetry" of a corrector having a geometrical and/or magnetic plane of symmetry complies with this general definition of the "vertical plane of magnetic symmetry with respect to the compass card" and constitutes a particular (and the most usual) application thereof.

The horizontal mean plane of such correctors is at a distance $h$ from that of the magnets of the compass card. Distance $h$ will be suitably chosen, for instance as will be hereinafter explained, as a function of the distance $l$ of these correctors from OX (or of the angle $\alpha_1$ between the horizontal plane passing through the compass card and the straight line passing through the centres of the compass card and of the correctors), so that the following condition is complied with: The constituent deviations of the fields produced at the center of the compass card as a result of the induction effects created in the correctors by the magnets of the compass card, first in the horizontal direction contained in the plane of magnetic symmetry with respect to the compass card of every corrector, secondly in the horizontal direction perpendicular to the preceding one, and thirdly in the vertical direction, algebraically add in each case to zero. Thus, if the corrector is a quadrantal corrector, the correction of the quadrantal deviation is good for all places, and if the corrector is a semi-circular corrector, the correction it achieves will be a pure semi-circular one and will not include a pseudo-quadrantal deviation the amplitude of which would vary with the magnetic latitude.

A particular application of the invention consists in making use of two identical correctors disposed symmetrically with respect to the axis OX of the compass, these correctors having the shape of bodies of revolution about an axis parallel to OX, and being flat (having for instance the shape of discs) and substantially isotropic from the magnetic point of view in directions perpendicular to axis OX. In this particular case (see for instance Fig. 4), if I designate by $2r$ the larger diameter of every corrector, the respective values of $l$, $h$ and $r$ are chosen in such manner that they comply substantially with the following relation:

$$l = 1.1(h + 0.5r)$$

that is to say that, for a given $r$, the centres $O_a$ and $O_b$ of correctors 1 and 2 are (Fig. 4) substantially on a cone of revolution the axis of which coincides with the axis OX of the compass card; the apex $S_c$ of this cone is at a distance $h_0$ close to $0.5r$ from the centre of the compass card and the semi-apex angle $\gamma$ of this cone is about $47°30'$. If for instance $$h = \frac{2r}{3}$$

(the derivation of this relation is developed further on), we have substantially $$l = \frac{4r}{3}$$

Compasses made according to my invention have, owing to the above described features, correctors which occupy but little space and have a simple shape, and are therefore easy to manufacture and of low cost while supplying a compensation correct for all points of the earth.

Furthermore, the adjustment of these correctors for the different values of the deviations to be corrected, according to the nature of the vehicle on which the compass is fitted and to the location of the compass in this vehicle, can be obtained in a simple manner by means of a single control element for every type of corrector (semi-circular or quadrantal) and without making it necessary to have several sets of correctors to cover the whole range of possible values of the quadrantal or semi-circular deviation.

I may for instance utilize, as shown by Figs. 15 and 16, two identical quadrantal correctors 1 and 2, disposed symmetrically with respect to the vertical axis OX passing through the centre O of the compass, the adjustment of the amplitude of the correction taking place by a translatory movement such that, for every position, the above stated relation between $h$ and $l$ is complied with, whereby the correctors are compensated induction correctors.

If, as shown by Figs. 15 and 16, correctors 1 and 2 are discs of revolution having a radius $r$, this translatory movement is advantageously obtained by mounting said correctors slidably on brackets 3 and 4 inclined at 47°30' with respect to OX and disposed in such manner that if $S_c$ is a point on OX such that $S_c$ and $O_aO_b$ are on either side of the horizontal plane passing through O and if the distance $OS_c$ is close to $0.5r$, the angle $O_aS_cO_b$ is always close to 95°.

I may also obtain adjustment of the amplitude of the quadrantal correction by making use, as indicated by Figs. 7 and 8, of two identical correctors symmetrically disposed with respect to a vertical plane passing through the centre of the compass and modifying the value $\beta$ of of the angle $O_{a_a}OO_{b_a}$, the relation between $h$ and $l$ being determined for every particular value of $\beta$, for instance through experimental methods examples of which will be hereinafter given, whereby the correctors are still compensated induction correctors. This supplementary parameter $\beta$ increases the possibilities of adjustment.

I may also, according to my invention, modify the relation between $h$, $l$ and $\beta$ by adjoining an additional corrector such as a bar which may be fixed in position. This bar supplies a further parameter which still increases the possibilities of the system. In particular, with main correctors having for instance the form of discs of revolution, it makes it possible to comply with the compensated induction condition for values of $\beta$ which may be as high as 90°. In other words, it makes it possible to adjust the compensation of the quadrantal deviation even if this deviation is extremely small.

This supplementary bar also makes it possible, according to a modification of my invention, to obtain compensated induction, for the various values of $\beta$ ranging from 180° to 90°, without making it necessary to modify $h$ or $l$. I thus achieve a remarkably simple arrangement of quadrantal correctors because adjustment of the correction amplitude between zero value and the maximum value is then obtained by merely varying $\beta$.

An example of such a device is shown by Figs. 12 and 13 in which 5 and 6 are the main correctors (flat discs in the case of the drawings); 7 is the additional bar. Adjustment of the amplitude of the correction is obtained by displacing knob 8 in the slot 9 of arm 10.

When use is made of correctors according to my invention which are fixed on the compass casing and in which adjustment is effected by making use either of correctors of dimensions different according to the value of the quadrantal to be compensated, or of correctors the adjustment of which is effected by keeping $h$ constant, I may also place, as indicated at 11 in Fig. 15, a corrector such as a semi-circular corrector, an inclination corrector or a band error corrector, in the vicinity of the point R symmetrically opposite to O with respect to the mean horizontal plane $O_aO_b$ of the quadrantal correctors (see column 16, lines 74 and 75, and column 17, lines 1 to 30).

Semi-circular correctors and band error correctors are well known. I call a corrector used in particular when the axis of rotation of the compass is kept fixed with respect to the vehicle an "inclination corrector." It serves to eliminate the deviations, such as pitching and rolling, due to the movements of the vehicle about horizontal axes.

The quadrantal correctors according to my invention make it possible, owing to this arrangement, to obtain the result that the direction of the magnetic field produced at the centre O of the compass by the corrector placed at R is not modified by the quadrantal correctors.

The above described arrangements may be improved by making use of quadrantal correctors constituted by superposed plates of magnetic metal, the direction of lamination, that is to say the direction of the successive plates, being possibly crossed and these plates being also possibly separated from each other by plates of a nonmagnetic substance. Such an arrangement reduces the hysteresis effects, that is to say the difference between the deviations for a given heading according as the vehicle is coming to this heading by rotation in one direction or in the other.

For instance, the correctors 5 and 6 of Figs. 12 and 13, 1 and 2 of Figs. 15 and 16 and also the additional element 7 of Fig. 12 are advantageously arranged with the laminated main correctors preferably along horizontal planes, and the additional corrector 7 preferably laminated along vertical planes parallel to the vertical plane of symmetry of the system of correctors.

Finally, if the compasses according to the invention are provided with Flinders bars, it will be advantageous, in order to preserve compensated induction without special adjustment despite the presence of these bars, to make use of two of these bars, identical in dimensions, and to dispose them at the same height and in such manner that the dihedral angle the ridge of which is the vertical axis OX and the two faces of which pass through the axes of the two Flinders bars has a value equal to 90°.

I will now explain how I have been led to the arrangement of correctors according to the invention and I will then give a theoretical explanation of my invention.

Taking the conventional case of a spherical or ellipsoidal corrector having a horizontal plane of symmetry which passes through the centre of the compass, calculation as developed hereinafter shows:

(a) That the corrector magnetized by the earth's field produces, at the centre of the compass, a field of quadrantal nature which is the sum of two combined effects due one to the horizontal component of the earth's field in the direction passing through the centres of the compass and of the corrector, the other to the horizontal component of the earth's field perpendicular to the preceding one;

(b) That, on the contrary, the undesirable field of pseudo-quadrantal type due to the magnetizing of the corrector by the magnets of the compass card is the difference of two opposed field vectors due, one to the component of the field of the magnets of the compass card in the direction passing through the centres of the compass and of the corrector (I will designate by $H_1$ the maximum value of this component), the other to the horizontal component perpendicular to the preceding one (I will designate by $H_2$ the maximum value of this component). But these two field vectors, although of directly opposed directions, generally have different respective magnitudes. This is why there remains a pseudo-quadrantal deviation due to the magnetizing of the corrector by the magnets of the compass card.

It is known that the ratio of components $H_1$ and $H_2$ is equal to 2 in the plane of the magnets of the compass card, but that it varies in the other planes.

Accordingly I conceived, according to my invention, of placing the correctors in a position where the ratio between the values of $H_1$ and $H_2$ is in fact such that the two detrimental effects which are subtracted from each other are equal in absolute value and therefore that the resultant pseudo-quadrantal deviation is zero.

The following theoretical explanation shows that this can be done and makes it possible to calculate, when the correctors are of simple geometrical shape, the positions with respect to the centre O of the compass which correspond to compensated induction. In the other cases, I will indicate hereinafter how these conditions can be determined experimentally.

It is known that two identical spheres of a radius equal to $r$ the centres $O_a$ and $O_b$ of which are in the horizontal plane passing through the centre O of the compass and which are symmetrical with respect to point O and at a distance $OO_a=OO_b=l$ from this centre, magnetize each other under the effect of the horizontal component H of the earth's magnetic field; consequently the total horizontal magnetic field which acts at O upon the compass is the resultant of two fields: one parallel to said component H and equal to (1) $$\lambda_1 H = H\left(1 + \frac{r^3}{l^3}\right)$$

and the other symmetrically opposite to said first one with respect to line $O_aO_b$ and equal to (2) $$\lambda_1 H \mathscr{D} = Hx\frac{3r^3}{l^3}$$

It is this second field which, having the character of a quadrantal field, is used to correct the quadrantal field of the ship.

From the two above Equations 1 and 2, I deduce:

(3) $$\mathscr{D} = \frac{3\frac{r^3}{l^3}}{1 + \frac{r^3}{l^3}}$$

As a matter of fact, the spheres are subjected not only to the induction of the earth's field H but also to the induction of the field of the compass card magnets.

It is known that, in order to avoid having the proximity of the correctors produce deviations of a higher order (sextantal, octantal, etc.), it is advisable to utilize for the compass card short parallel magnets disposed in a suitable fashion. I may also make use of a single magnet having the shape of a body of revolution the magnetization of which is uniform, that is to say such that at all points of the body it has the same numerical value and the same direction, this direction further being perpendicular to the axis of revolution of said magnet.

In this last mentioned case, the field produced by this system is the same as that of a magnetic dipole placed at the centre of the compass. In the other case, the external field at some distance from the ends of the magnets is very close to that of a magnetic dipole placed also at the centre of the compass.

We will first consider Figs. 1 and 2.

It will be supposed, for the sake of simplicity, that the correctors that are used have a vertical plane of symmetry passing through O.

It is known that the potential U at the point $O_1$ of the field of doublet SN having a magnetic moment M has for its value $$U = M\frac{\cos \alpha_1}{\overline{OO_1}^2}$$

$\alpha_1$ being the angle of SN with $OO_1$, so that:

(4) $$U = M\frac{l}{(l^2 + h^2)^{3/2}}$$

The potential of this field at the point $O_3$ has for its value:

$$U \cos \theta_1 = M\frac{l}{(l^2 + h^2)^{3/2}} \times \cos \theta_1$$

in which $\theta_1$ designates the angle that the vertical half-plane passing through $OO_3$ makes with the vertical half-plane passing through the South-North direction of the magnets of the compass card.

Under the effect of the horizontal field of the compass card magnets, the corrector when placed at $O_1$ is magnetized and becomes substantially equivalent, concerning the field it produces at O, to a magnetic dipole having a magnetic moment $M_1$ placed on the line $OO_1$ close to point $O_1$. As the corrector has its plane of symmetry coincident with $OO_1$, the direction of this dipole is $OO_1$. The horizontal field produced at $O_1$ by the compass card magnets is $H_1$.

It is known that if a sphere of centre $O_1$ and of radius $r$ is placed in a uniform field $H_1$, it gets magnetized and becomes equivalent, from the point of view of the field it produces at an external point, to a magnetic dipole placed at $O_1$ equipolent to $H_1$ and having a magnetic moment $M_1 = k_1 H_1 r^3$, with $k_1$ close to 1.

By analogy with what takes place in the case of the sphere, I may also write for the corrector:

$$M_1 = k_1 H_1 r^3$$

In this formula, $k_1$ is a constant which depends upon the shape of the corrector and upon $h$ and $l$ (since the field of dipole SN is not uniform inside the whole volume of the corrector). $k_1$ depends also upon the magnetic permeability of the corrector in the horizontal direction of the vertical plane passing through $OO_1$.

$r$ is a horizontal dimension of the corrector which is introduced to account for the influence of its dimensions (to similar correctors correspond values of $M_1$ substantially proportional to the cube of the ratio of their corresponding linear dimensions).

$H_1$ is the horizontal field at $O_1$; therefore $$H_1 = -\frac{\delta U}{\delta l}$$

Likewise the corrector when placed at $O_2$ becomes, under the horizontal magnetizing effect of dipole SN, substantially equivalent to a dipole located in the vicinity of $O_2$ perpendicular to the vertical plane passing through $OO_2$ and having a magnetic moment equal to $$M_2 = k_2 H_2 r^3$$

$H_2$ is the horizontal field at $O_2$; it is parallel to SN, of a direction opposed to that of SN and its value is the value of $$-\frac{1}{l}\left(\frac{\partial U}{\partial \theta_1}\right)$$

for $\theta_1 = 90°$, i.e. $U/l$.

$k_2$ depends upon the shape, the dimensions, the nature of the corrector and its magnetic permeability in the direction perpendicular to the vertical plane $OO_2$.

Finally, the corrector when placed at $O_3$ becomes, under the action of the horizontal components of the field of dipole SN, equivalent to a horizontal magnetic dipole located in the vertical plane $OO_3$ close to point $O_3$ and the magnetic moment of which is the resultant of two magnetic moments: One radial and equal to:

$$M_1 \cos \theta_1 = -k_1 r^3 \times \left(\frac{\partial U}{\partial l}\right) \times \cos \theta_1$$

the positive direction of which is in direction $OO_3$, the other at right angles to the preceding one, of a value:

$$M_2 \sin \theta_1 = k_2 r^3 \times \frac{U}{l} \times \sin \theta_1$$

the positive direction of which is in the direction of increasing angles $\theta_1$.

The horizontal component of the field produced at the centre O of the compass by the first dipole is equal to $$\frac{1}{M}k_1 r^3 \cos \theta_1 \left(\frac{\partial U}{\partial l}\right)^2$$

and makes an angle $\theta_1$ with direction SN.

The horizontal component of the field produced at the same point O by the second dipole is equal to $$\frac{1}{M}k_2 r^3 \sin \theta_1 \left(\frac{U}{l}\right)^2$$

and makes an angle equal to $-180°$ with the preceding one.

Figure 3:
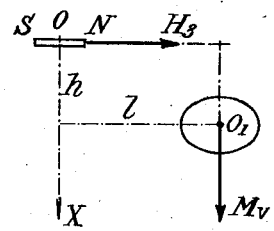

Under the effect of the vertical component of the field of the magnets of centre O, the corrector is magnetized and becomes, in first approximation, equivalent to a vertical dipole having its centre close to $O_1$ and the magnetic moment of which is maximum when the vertical plane passing through O and $O_1$ is in the direction of the magnets of the compass card (Fig. 3). This magnetic moment may, when this plane makes an angle $\theta_1$ with the magnets of the compass card, be written in the following form:

$$M_v \cos \theta_1 = -k_3 r^3 \frac{\partial U}{\partial h} \cos \theta_1$$

$k_3$ being a constant determined in accordance with the shape and magnetic permeability of the corrector.

This vertical dipole produces in turn at the centre O of the magnets of the compass card a field the horizontal component of which has a value equal to: $H_3 \cos \theta_1$, where $$H_3 = -\frac{1}{M} M_v \frac{\partial U_v}{\partial l}$$

with $$U_v = \frac{Mh}{(l^2+h^2)^{3/2}}$$

$H_3$ is in the vertical plane containing O and $O_3$, that is to say making an angle $\theta_1$ with the direction SN;
$H_3 \cos \theta_1$ is therefore combined with the field $$\frac{1}{M} k_1 r^3 \cos \theta_1 \left(\frac{\partial U}{\partial l}\right)^2$$

By a reasoning similar to that applying to the case of a sphere placed in a uniform field, it is seen that the field due to the magnetizing of the quadrantal corrector by the compass card magnets has for components at the centre of the compass:

(1) A constant field equal to:

(5) $$\frac{r^3}{2M}\left[k_1\left(\frac{\partial U}{\partial l}\right)^2 + k_2\left(\frac{U}{l}\right)^2 - k_3\frac{\partial U}{\partial h}\frac{\partial U_v}{\partial l}\right]$$

having the same direction as the magnets of the compass card. This field therefore produces no deviation, at least as long as the viscosity and hysteresis phenomena are neglected;

(2) A field of constant amplitude equal to:

(6) $$N_r = \frac{r^3}{2M}\left[k_1\left(\frac{\partial U}{\partial l}\right)^2 - k_2\left(\frac{U}{l}\right)^2 + k_3\frac{\partial U}{\partial h}\frac{\partial U_v}{\partial l}\right]$$

and symmetrically opposite to the South-North direction of the compass card magnets with respect to line $OO_3$.

It is the pseudo-quadrantal field $N_r$ which, remaining constant when the point of the surface of the earth where it exists is varied, whereas the quadrantal N of the vehicle remains proportional to H, makes it necessary to readjust the correction of the quadrantal error when the magnetic latitude varies.

U and $U_v$ are proportional to the magnetic moment M of the magnets of the compass card and therefore $N_r$ is also proportional thereto. This is why it has a detrimental importance when use is made of wet compasses having a high magnetic moment.

It is also seen that, all other things being equal, $N_r$ increases very quickly when it is endeavoured to reduce the dimensions of the compasses, which are substantially proportional to $2(r+l)$.

In order to correct the same value of the quadrantal, it is necessary to keep constant the ratio $r^3/l^3$ (according to Formula 3) and, in these conditions, $N_r$ increases proportionally to $1/l^3$ as it results from Formulas 4 and 6 and consequently $N_r$ increases very quickly when the dimensions of the corrector decrease.

If $h^2+l^2 = \rho^2$ I have, according to Formula 4:

$$\frac{1}{M}k_1 r^3 \left(\frac{\partial U}{\partial l}\right)^2 = k_1 r^3 M \frac{(2l^2-h^2)^2}{\rho^{10}}$$

$$\frac{1}{M}k_2 r^3 \left(\frac{U}{l}\right)^2 = k_2 r^3 M \frac{1}{\rho^6}$$

$$k_3 \frac{\partial U}{\partial h}\frac{\partial U_v}{\partial l} = 9k_3 r^3 M \frac{l^2 h^2}{\rho^{10}}$$

Consequently, by substituting in Formula 6, the pseudo-quadrantal field to be reduced to zero is proportional to:

$$N_r = \frac{k_1(2l^2-h^2)^2 + 9k_3 l^2 h^2 - k_2(l^2+h^2)^2}{\rho^{10}}$$

I $N_r$ is equal to zero, I find:

$$k_1(2l^2-h^2)^2 + 9k_3 l^2 h^2 - k_2(l^2+h^2)^2 = 0$$

This formula supplies the general condition for the obtainment of a quadrantal corrector of the compensated induction type.

If, as is generally the case, the mean horizontal plane of the quadrantal correctors is placed in the horizontal plane of the compass card magnets ($h=0$), the preceding condition becomes:

$$k_2 = 4k_1$$

It has already been proposed to make use of correctors elongated in the direction at right angles to $OO_3$ which complies with this equation.

However this solution is not very convenient for making a compass of reduced size. As a matter of fact, due to the proximity of the magnets of the compass card and of the quadrantal correctors, these correctors are placed in non uniform fields. Therefore, the coefficients $k_1$ and $k_2$ depend not only upon the geometrical form and the magnetic characteristics, and in particular upon anisotropy of the correctors, but also upon the distance of these correctors from the centre O of the compass. It would therefore be necessary, in order to correct the various possible values of the quadrantal, to have a whole set of correctors of different shapes and dimensions which would be placed at suitable distances from the magnets of the compass card according to the value of the quadrantal to be corrected.

The solution according to my invention consists in keeping parameter $h$, which makes it possible to make $N_r$ equal to zero, not by acting solely upon the coefficients $k_1$ and $k_2$ of the correctors (which method is not suitable because it imposes on the correctors rigid geometrical and magnetic conditions) but by acting upon the relation between $l$ and $h$, which is much simpler, and therefore by placing the correctors in such manner that their horizontal plane of symmetry is different from that of the compass card and that, furthermore, the distance $l$ between their centre and the axis of the compass card is determined, in accordance with their distance $h$ from the plane of the compass card, in such manner that $N_r$ is zero.

I will merely suppose that use is made of flat bodies, that is to say bodies the vertical dimensions of which are small as compared to their horizontal dimensions, or more generally bodies the apparent permeability of which in the vertical direction is low as compared with their apparent permeability in horizontal directions.

As a rule, on the drawings, I have shown circular discs, but of course the results above indicated remain whatever be the shape of the bodies and in particular if use is made of discs or rings having a vertical plane of symmetry passing through the centre of the compass. I may also make use of bodies which are thicker vertically provided that the apparent magnetic permeability is lower in the vertical direction than in other directions. Such a result may be obtained for instance by superimposing flat discs made of ferromagnetic material separated from each other by plates of non magnetic material such as copper, brass, aluminum or an insulating material. The utility of such an arrangement will appear hereinafter.

If the corrector is of a shape and/or of magnetic characteristics such that $k_3$ is negligible as compared with $k_1$ and $k_2$ (for instance flat and/or laminated body), condition $N_r=0$ becomes:

$$k_1\left(\frac{\partial U}{\partial l}\right)^2 - k_2\left(\frac{U}{l}\right)^2 = 0$$

that is to say:

(7) $$\frac{\partial U}{\partial l}=\mp\sqrt{\frac{k_2}{k_1}}\times\frac{U}{l}$$

U having the value indicated by Formula 4. From this Formula 4 I obtain:

$$\frac{\partial U}{\partial l}=\frac{U}{l}-\frac{3Ml^2}{(l^2+h^2)^{5/2}}=\frac{U}{l}-\frac{3.l}{l^2+h^2}\times U$$

Equation 7 is therefore equivalent to:

(8) $$\frac{1}{l}-\frac{3.l}{l^2+h^2}=\pm\sqrt{\frac{k_2}{k_1}}\times\frac{1}{l}$$

or (9) $$\frac{1}{l}\left(1\pm\sqrt{\frac{k_2}{k_1}}\right)-\frac{3.l}{l^2+h^2}=0$$

This is the equation of four straight lines passing through the centre O of the compass, symmetric two by two with respect to the vertical OX and the angular coefficient of which has for its absolute value:

$$\left|\frac{l}{h}\right|=\sqrt{\frac{1\mp\sqrt{\frac{k_2}{k_1}}}{2\pm\sqrt{\frac{k_2}{k_1}}}}$$

In this equality, if I choose sign "+" in the numerator, the sign "—" must be chosen in the denominator and vice versa.

In the case of quadrantal correctors, the most interesting of these positions is that which corresponds to:

$$\left|\frac{l}{h}\right|=\sqrt{\frac{1+\sqrt{\frac{k_2}{k_1}}}{2-\sqrt{\frac{k_2}{k_1}}}}$$

because it corresponds to the highest value of the useful quadrantal.

If, for simplification purposes, I write $$\sqrt{\frac{k_2}{k_1}}=1+a$$

I obtain:

$$\left|\frac{l}{h}\right|=\sqrt{\frac{2+a}{1-a}}$$

If the centre O of the compass were sufficiently far from the centre $O_1$ of the corrector so that the field produced by the compass card magnets could be considered as uniform inside the whole of the corrector and if this corrector had the shape of a circular disc or ring and were magnetically isotropic, the two coefficients $k_2$ and $k_1$ would be equal and I would have:

$$\frac{l}{h}=\pm\sqrt{2}$$

(In this simple case, it is seen that the solution (taking $\sqrt{k_2/k_1}=-1$), which has been neglected would correspond to $l=0$, that is to say to a horizontal disc or ring having its centre on the vertical of the compass; this disc or ring would produce no quadrantal correction.)

According to this approximative theory, a compensated induction corrector might be a flat circular disc or ring, horizontal and having its centre located on a cone of revolution having a vertical axis and its apex at the centre O of the compass, the half-apex angle of this cone being equal to arc $tg\sqrt{2}$, that is to say substantially 55°.

But, actually, things are somewhat more complex.

On the one hand, the field produced by the magnets of the compass card is not uniform inside the whole of the corrector and the coefficients $k_2$ and $k_1$ cannot be considered as independent of distance $OO_1$. The positions of centre $O_1$ corresponding to compensated induction will therefore be located on a curve which will not be exactly a straight line and which will not pass through the centre O of the compass.

On the other hand, same as in the case of conventional correctors, it is advantageous to make use of two identical correctors disposed symmetrically on either side of the vertical OX passing through the centre O of the compass. What takes place is then slightly complicated due to mutual induction between these two correctors.

The position of centre $O_1$ of each of the correctors with respect to the vertical OX is finally changed so as to provide a greater distance than in the position given by the above simplified theory where these two phenomena have not been taken into account.

I will hereinafter indicate how it is possible theoretically to determine the position of the centres of the correctors in a more accurate fashion by taking into account the lack of uniformity of the magnetic field of the magnets of the compass card. I will also show how it is possible experimentally to determine these positions in all cases and in particular when the correctors are not magnetically isotropic rings or discs having the shape of bodies of revolution.

Anyway, the above theory shows that it is possible to obtain on the one hand a compensation of the semi-circular deviation without any disturbing deviation due to the compass card magnets and, on the other hand, a compensation of the quadrantal deviation independent of the magnetic latitude, by making use of flat correctors having a mean horizontal plane $P_c$ at a distance from the horizontal plane $P_r$ of the compass card magnets and by suitably choosing the relation between the distance apart of the two planes $P_c$ and $P_r$ on the one hand, and the spacing of the correctors with respect to the vertical axis passing through the centre of the compass card on the other hand.

I will now turn back to the case where $k_3$ is not negligible.

When the corrector, supposed to be magnetically isotropic, has the form of a body of revolution about a vertical axis and when the field produced by the compass card magnets can be considered as uniform in the volume of said corrector, $k_1$ is equal to $k_2$. I will call $k$ the ratio $k_3/k_1$.

The condition $N_r=0$, that is to say:

$$k_1(2l^2-h^2)^2+9k_3l^2h^2-k_2(l^2+h^2)^2=0$$

is written with the simplification:

$$l=\pm\sqrt{2-3k.h}$$

The thickness therefore leads to locating the correctors closer to the axis.

It will be seen in particular that with homogeneous and isotropic spheres ($k=1$), it is impossible to find a position such as $N_r=0$.

With flat bodies ($k\ll1$), the problem is soluble as long as $k<\frac{2}{3}$. Besides, the solution $k=\frac{2}{3}$ leads to placing the centre of the corrector on the vertical axis of revolution OX, which supplies no quadrantal deviation and is therefore without interest in the case of quadrantal correctors.

When the corrector supposed to be magnetically isotropic is sufficiently flat to make coefficient $k_3$ negligible as compared with $k_1$ and $k_2$ and when this corrector has a shape such that $k_2/k_1$ can be calculated (elliptic horizontal section for instance), it is possible to find with a closer approximation the relation between $l$ and $h$ which corresponds to compensated induction, without supposing that the magnetic field is uniform.

In the position $O_1$ of Figs. 1 and 2 where A and B are the points of the corrector located in the vertical plane of symmetry thereof which are respectively the nearest and the farthest from the axis of the compass card, the inductor field has for its mean value:

$$-\frac{1}{AB}\int_A^B \frac{\partial U}{\partial l}dl = \frac{U_A - U_B}{AB} \text{ with} \begin{cases} U_A = \frac{M \times OA}{(h^2 + \overline{OA}^2)^{3/2}} \\ U_B = \frac{M \times OB}{(h^2 + \overline{OB}^2)^{3/2}} \end{cases}$$

In the position $O_2$ of this same figure, it can be admitted that the inductor field has for its value $$\frac{M}{(h^2 + l^2)^{3/2}}$$

If the dimension AB of the corrector is arbitrarily chosen, it is possible, for every value of $h$, to trace on the one hand the curve of the values of $$\left|\frac{U_A - U_B}{M \times AB}\right|$$

(absolute value) as a function of $l$ and, on the other hand, the curve of $$\frac{\sqrt{k_2/k_1}}{(h^2 + l^2)^{3/2}}$$

as a function of $l$. These two curves intersect each other at a point the abscissa $l$ of which supplies the distance $l$ at which it is necessary to place the centre $O_1$ of the corrector in order to obtain that, if its mean plane is at a height $h$ with respect to the centre O of the compass card magnets, the corrector is of the compensated induction type.

When such calculations are made for different values of $h$, the theoretical locus of centre $O_1$ is obtained.

When the correctors are in the form of flat bodies of revolution, it is found that if $h$ ranges for instance from $$\frac{2r}{3} \text{ to } 2r$$

(which constitutes the interesting values of $h$ for correcting the usual quadrantal deviations), the centre $O_1$ of the disc or ring must be located substantially on a cone the semi-apex angle of which has a value approximating $47°30'$ and the apex $S_c$ of which is upon the axis OX at a height $h_0 = -0.55r$ (Fig. 4), which corresponds to the equation

(10) $\quad l = 1.1(h + 0.55r)$

Experimentally the positions that are found are very close to those above indicated when use is made of two correctors in the form of flat circular discs or rings which are magnetically isotropic and placed symmetrically on either side of the vertical OX passing through the centre O of the compass card magnets. In these conditions, I find a cone of the same apex angle as the preceding one but on the apex of which is at the height $-0.505\ r$, which corresponds to the equation

(11) $\quad l = 1.1(h + 0.505r)$

I will hereinafter indicate various experimental methods which make it possible to find the position of the correctors corresponding to compensated induction.

I will first consider the case of quadrantal correctors.

(a) I may, by means of suitably disposed electrical circuits, produce in the vicinity of the compass and of the correctors a field parallel to the horizontal component H of the earth's field. This field must be as uniform as possible in the region where the correctors and the magnets of the compass card are located. I obtain this result by utilizing for instance Helmholz circuits which are, as it is known, constituted by two equal circular circuits located in two vertical planes perpendicular to the straight line passing through the centres of the two circuits and separated by a distance equal to the radius of these circuits.

The deviations of the compass card magnets at the intercardinal magnetic headings are measured first in the magnetic field alone (no current flowing through the circuits), then with a current flowing through the circuits, such for instance that the field that is produced by the circuits in the vicinity of the compass is equipollent to H.

If the correctors are disposed in such manner that the vertical plane of symmetry of the whole of the correctors is in the direction NS (or EW) when the line of the compass is in the direction of the magnetic north, the pseudo-quadrantal field has for its expression $N_r x e^{2i\theta_1}$. If $\mathcal{D}_r$ is the pseudo-quadrantal deviation which results therefrom $\mathcal{D}_r = N_r/\lambda H$, $\lambda H$ being the mean value, at the centre O of the compass, of the director field toward the magnetic north.

With no current flowing through the Helmholz circuits, I obtain:

$$\frac{\delta_{NE} - \delta_{SE} + \delta_{SW} - \delta_{NW}}{4} = \mathcal{D} + \mathcal{D}_r$$

$\mathcal{D}$ being the quadrantal deviation produced by the correctors under the effect of the induction of the earth's field $$\delta_{NE}, \delta_{SE}, \delta_{SW}, \delta_{NW}$$

being the deviation measured at the four intercardinal magnetic headings.

Likewise, with a current passing through the Helmholz circuits such that the field in the vicinity of the compass is equal to 2H:

$$\frac{\delta'_{NE} - \delta'_{SE} + \delta'_{SW} - \delta'_{NW}}{4} = \mathcal{D} + \frac{\mathcal{D}_r}{2}$$

As a matter of fact, $\mathcal{D}$ is independent of the intensity of the field H acting upon the compass and $\mathcal{D}_r = N_r/\lambda H$ is inversely proportional to this field, since $N_r$ is independent thereof.

These two series of measurements therefore make it possible to calculate $\mathcal{D}_r$ and $\mathcal{D}$.

By repeating this operation for given values of the distance $l$ from the centre of the correctors to the vertical OX passing through the centre O of the magnets of the compass card, I may trace curve $\mathcal{D}_r$ as a function of $l$ and thus determine the distance $l$ corresponding to $\mathcal{D}_r = 0$, that is to say to compensated induction. I will thus know the value $\mathcal{D}$ of the quadrantal deviation that these correctors will be able to compensate for. I may operate with different values $h$ of the distance from the horizontal plane of symmetry of the correctors to the horizontal plane of the compass card magnets and finally determine the values of $l$ as a function of $h$ that correspond to compensated induction ($\mathcal{D}_r = 0$) and the corresponding $\mathcal{D}$ values.

It is therefore possible to adjust the position of the correctors ($l$ as a function of $h$) so that they are compensated induction correctors.

(b) I may measure $N_r$ in the following manner:

I place the correctors in such manner that their vertical plane of symmetry makes an angle of 45° with the NS direction of the compass card magnets. I measure the total magnetic field at the centre of the compass card magnets by means of a deflector, which is a field measuring apparatus including a magnet parallel to the magnets of the compass card and producing a field of a direction opposed to that of the field to be measured. If the magnet of the deflector is displaced so as to produce a rotation of 90° of the magnets of the compass card, it is known that the value of the field measured by the deflector is different according as the magnets have turned by 90° toward the right or toward the left and that this difference is in fact equal to $2N_r$.

This gives another method for measuring the position of the correctors corresponding to $N_r = 0$ (therefore to $\mathcal{D}_r = 0$).

Figure 4:
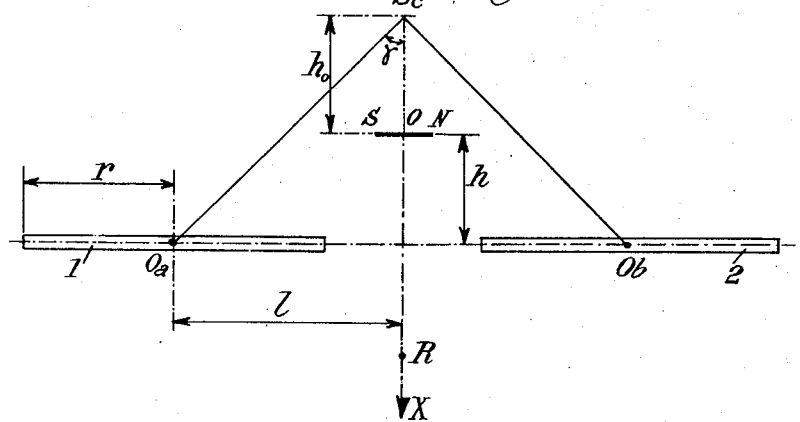
Fig. 4 is a diagrammatical view showing in elevation the respective positions that may be occupied by the centres of the compass card and of the correctors according to the invention when said correctors are in the form of flat bodies of revolution.

(c) Finally it may be noted that, if the correctors have a horizontal plane of symmetry, they produce, under the action of their being magnetized by the magnets of the compass card, the same field at the centre O of the compass and at the point R symmetrically opposite to point O with respect to the horizontal plane of symmetry of these correctors (Fig. 4). I may, for instance, fix the compass card magnets and dispose the correctors in such manner that their vertical plane of symmetry is at 45° to the vertical plane parallel to the magnets of the compass card. The correctors will be suitably placed with respect to the vertical axis OX when, at point R, the component of the total magnetic field measured in the direction perpendicular to the vertical plane parallel to the magnets of the compass does not change when these magnets are turned through 180° by mechanical means (for instance manually).

I may also leave the compass card magnets free to rotate and turn the correctors so that their vertical plane of symmetry makes an angle of 45° with the compass card magnets.

The correctors will be suitably placed if the introduction at R of a magnet parallel to the magnets of the compass card produces no deviation thereof.

Besides I may take advantage of the property of points O and R with respect to compensated induction correctors by placing at R the semi-circular deviation correctors or, either the band error corrector (in the case of a compass the compass card of which is intended to remain horizontal), or the inclination error corrector (in the case of a compass card the axis of which is fixed with respect to the vehicle on which the compass is fitted).

As a matter of fact, it is known that when soft iron correctors are placed at the vicinity of the compass in dissymmetrical fashion with respect to the longitudinal axis of the ship (this is the case for instance of quadrantal correctors when $\mathscr{E}$ is different from zero), a longitudinal magnet produces not only a field $\lambda H \, \mathscr{B}$ but also a field $\lambda H \Delta \, \mathscr{C}$. Likewise, a transverse magnet produces, in addition to the field $\lambda H \, \mathscr{C}$, a field $\lambda H \Delta \, \mathscr{B}$. This is no longer the case if the semi-circular corrector is placed in the vicinity of point R, symmetrically opposite to the centre O of the magnets of the compass card with respect to the horizontal plane of symmetry of the quadrantal correctors according to the invention.

Such an arrangement facilitates the compensation operations.

Likewise, a band or inclination error corrector placed at R will not produce parasitic effects when the vehicle becomes inclined, contrary to what takes place with these correctors in the presence of the conventional quadrantal correctors. If for instance the compass card and the quadrantal correctors are fixed with respect to the vehicle and there is placed at R an inclination corrector, for instance a coil suspended through a universal joint and through which passes a current, the axis of this coil remaining vertical, the total field produced at O, even in the presence of soft iron correctors, will remain, when the vehicle gets inclined, parallel to the projection of the axis of the coil on the plane of the compass card and the intensity of this field, for a given inclination, will keep the same value whatever be the direction of the axis of inclination, whether it is transversal (rolling) or longitudinal (pitching).

In the case of semi-circular correctors, it is possible, in order experimentally to find the position that corresponds to a pure semi-circular, to operate as above stated, at B). I may also measure the deviations produced by the semi-circular correctors at the respective cardinal and intercardinal magnetic headings, perform the harmonic analysis of the curve of the deviations thus measured, deduce therefrom the value $N_r$ of the amplitude of the second harmonic of this curve, trace the curve of the values of $N_r$ corresponding to the different values of the distance $l$ from the centre of the correctors to the vertical OX passing through the centre O of the compass magnets, and thus determine the value of $l$ which corresponds to $N_r = 0$, that is to say the desired position of the correctors.

Therefore, a flat corrector or a pair of flat correctors being chosen, I know how to determine experimentally in all cases, and by calculation when these correctors have a simple shape, for instance the shape of a disc or a ring of revolution, the positions of these correctors with respect to the vertical axis of rotation OX of the compass card magnets (distance $l$) and with respect to the horizontal plane of these magnets (distance $h$) which correspond to compensated induction, that is to say which permit a final correction at all places of the deviation.

I will show how it is possible, in the case of quadrantal correctors, to determine the dimensions of the correctors in order to correct a given quadrantal deviation.

It has been seen that, in the case of two spheres of a radius equal to $r$ placed in the horizontal plane of the magnets of the compass card symmetrically on either side of the centre O of these magnets, if $l$ is the distance from the centre $O_1$ of one of these spheres to point O, I have (Formula 3):

$$\mathscr{D} = \frac{3\frac{r^3}{l^3}}{1 + \frac{r^3}{l^3}}$$

In the general case where $h$ has any possible value, I have, if $u$ has a value $$u = \frac{U}{M}$$

(U being given by Formula 4):

$$\mathscr{D} = \frac{r^3\left(\frac{u}{l} - \frac{\partial u}{\partial l}\right)}{1 - r^3\left(\frac{\partial u}{\partial l} + \frac{u}{l}\right)}$$

This formula can be generalized to the case of a pair of flat discs disposed symmetrically with respect to the vertical OX passing through the centre O of the compass, the plane along which these discs are flat being horizontal. These discs produce a quadrantal deviation the value of which is:

(12) $$\mathscr{D} = \frac{r^3\left(k_2\frac{u}{l} - k_1\frac{\partial u}{\partial l}\right)}{1 - r^3\left(k_1\frac{\partial u}{\partial l} + k_2\frac{u}{l}\right)}$$

When the discs are of revolution and magnetically isotropic, I have: $k_1 = k_2$.

The equality is in this case quite exact because the field which produces deviation $\mathscr{D}$ is the field H and it is uniform for the whole of the volume of the correctors.

It is possible to calculate $k_1$ and $k_2$ in the case where the discs are supposed to correspond to extremely flat ellipsoids.

In particular, a flat disc of revolution the semi-thickness of which is $c_2$ and the radius $r(c_2 \ll r)$, located in a field H perpendicular to the axis of revolution, assumes an intensity of magnetization $\mathscr{I}$ given by the following Formula:

$$\mathscr{I} = \frac{\chi H}{1 + \pi^2 \frac{c_2}{r}\chi}$$

$\chi$ being the magnetic susceptibility of the material of which the disc is made.

If $\chi$ is sufficiently large to have $$\pi^2 \frac{c_2}{r}\chi \gg 1$$

I have:

$$\mathscr{I} = \frac{rH}{\pi^2 c_2}$$

The magnetic moment M of this disc of volume V is $\mathscr{I}$V, that is to say $2\mathscr{I} \times \pi r^2 c_2$ or $$M = \frac{2r^3}{\pi} \times H$$

For such a disc, I therefore have $$k_1 = k_2 = \frac{2}{\pi}$$

It is thus seen that if $$\pi^2 \frac{c_2}{r} \chi \gg 1$$

$\chi$ is eliminated from the formulas, $k_1$ and $k_2$ are practically unchanged by small variations of $\chi$: the magnetic isotropy of the correctors is therefore not critical and a slight lack of isotropy practically does not change the value of $\mathscr{D}$ or the position corresponding to $\mathscr{D}_r = 0$.

Formula 12 then becomes, in this particular case, if $l^2 + h^2 = \rho^2$:

$$(13) \quad \mathscr{D} = \frac{\frac{6r^3}{\pi} l^2}{\rho^5 + \frac{2}{\pi} r^3 (l^2 - 2h^2)} = \frac{6r^3 l^2}{\pi \rho^5 + 2r^3 (l^2 - 2h^2)}$$

Thus, if I choose two discs of a radius equal to $r$, it is possible, by means of Formulas 10 or 11, to determine, as a function of their height $h$ with respect to the centre O of the compass, the distances $l$ of the centres of the discs from the vertical axis passing through O and, therefore, by means of Formula 13, the various corresponding values of the quadrantal deviation that these discs permit of correcting.

Therefore I have already two possibilities to vary the amplitude of the quadrantal to be corrected:

(a) To choose correctors of different dimensions which are disposed always in the same horizontal plane at a distance $h$ from the horizontal plane containing the compass card magnets, the position of these correctors, with respect to the vertical passing through the centre of the compass, being determined, when designing the compass, through one of the above indicated methods. The corrected quadrantal deviation will vary in first approximation as the cube of the dimensions of the correctors;

(b) To choose two correctors the height $h$ of which will be modified (and therefore correlatively the distance $l$ with respect to the vertical axis OX and according to the approximate law $\Delta l / \Delta h = 1.1$ if the correctors have the shape of a flat revolution disc or ring), which makes it possible gradually to vary the quadrantal correction.

Experimentally or by combining Formulas 10 or 11 and 12 or 13, it is found that $\mathscr{D}$ varies approximately as $1/h^{2.3}$ to $1/h^{2.8}$ ($\mathscr{D}$ would vary as $1/h^3$ if the cone, which is the locus of the centres of the correctors, had its apex $S_c$ at the centre O of the compass).

(c) Of course, it is possible to combine methods (a) and (b) and this all the more easily as the apex angle of the cone along the generatrices of which are to be displaced the correctors does not depend upon the dimensions of these correctors.

(d) Finally I may make use of another method to vary the amplitude of the quadrantal deviation produced by a system of two identical correctors.

If use is made of two identical correctors which are symmetrical with respect to a vertical plane passing through the vertical axis OX of the compass, it may be imagined that one of the correctors is made to coincide with the other by a rotation $\beta$ about axis OX. It is particularly convenient to consider the angle $$\alpha = \frac{1}{2}(\pi - \beta)$$

Let us call $\mathscr{D}$ the value of the quadrantal deviation that these correctors can compensate when $\beta = 180°$ (case of Figs. 5 and 6) ($\alpha = 0$). When $\beta$ has any value (case of Figs. 7 and 8), if $h$ and $l$ have not been changed, the value of the quadrantal deviation that the correctors will compensate will be $\mathscr{D}_\alpha$ such that:

$$\mathscr{D}_\alpha = -\mathscr{D} \cos \beta \text{ or } \mathscr{D}_\alpha = \mathscr{D} \cos 2\alpha$$

I might therefore vary $\mathscr{D}_\alpha$ in a continuous manner between 0 and a maximum value $\mathscr{D}$ by varying $\beta$ from 90 to 180° ($\alpha$ between 45° and 0°).

However, a difficulty occurs if, as is the case, it is desired to obtain for each of the values of $\mathscr{D}_\alpha$, therefore for every value of $\alpha$, the condition $\mathscr{D}_r = 0$, that is to say a compensated induction correction or, in other words, a correction which is good at all locations.

As a matter of fact, it is no longer possible, as soon as $\alpha$ differs substantially from 0°, to neglect the mutual induction between the two correctors. In other words, the relation between $l$ and $h$ for discs of given dimensions is no longer given by Equations 10 or 11. The distance $l$ varies with $\alpha$.

Experimentally the problem is easy to treat. I may for instance, for a pair of given correctors, obtain, through one of the experimental methods which have been above indicated and for different values of $\alpha$ ranging from 0° to 45°, the value $l_\alpha$ which corresponds to $\mathscr{D}_r = 0$. It is found substantially, for rather small values of $\alpha$ that $$\frac{l_\alpha - r}{\cos \alpha} = l - r$$

$l$ being given by (11) as a function of the height $h$.

In other words, when $h$ does not vary, the position of the centre $O_1$ of a corrector corresponding to $\mathscr{D}_r = 0$ corresponds substantially to a fraction of a conchoid of a circle. As a matter of fact, if $O_a$ (Fig. 9) is the position with respect to the vertical passing through the centre O of the compass (the compass being seen in plan view) of the centre $O_1$ of the corrector when angle $\alpha$ is zero.

$OO_a = l$. If A is the point of the corrector which is the closest to axis O, $$OA = l - r$$

When $\alpha$ has a value which is not zero, the centre of the corrector is at $O_{a_\alpha}$ such that $OO_{a_\alpha} = l_\alpha$. The point of the corrector which is closest to the axis is $A_\alpha$ and $OA_\alpha = l_\alpha - r$, therefore $OA_\alpha = OA \cos \alpha$ since, as above indicated, $$\frac{l_\alpha - r}{\cos \alpha} = l - r$$

The point $A_\alpha$ is therefore on a circle of a diameter equal to OA. The centre $O_{a_\alpha}$ of the corrector is on a conchoid having its pole at O which, for values of $\alpha$ ranging from zero to 45° coincides practically with the osculating circle at the point corresponding to $\alpha = 0$.

However, when $\alpha$ is about equal to 45°, if $h/r$ is not too great (and $h/r$ must be sufficiently small so that $\mathscr{D}$ maximum has a suitable value), the mutual induction becomes such that it is no longer possible, with circular discs, to find a position corresponding to compensated induction.

By making use of two cylindrical correctors of a height small with respect to their radius $r$, I have determined experimentally, for various values of the vertical distance $h$ from the horizontal plane of the correctors to the plane of the magnets of the compass card, the values of $l_\alpha$ when $\alpha$ varies. Fig. 10 shows the system of curves thus obtained ($l_\alpha / r$ as a function of $\alpha$ for different values of $h/r$).

This system of curves makes it possible to conceive the possibility of varying $\mathscr{D}$ within wider limits, for given maximum overall dimensions, than with the method disclosed by Fig. 4 which consists in displacing the centres of the discs on the generatrices of a cone having apex $S_c$.

If for instance, for reasons of simplicity of mechanical construction, I admit that $l_a$ is constant, the system of curves of Fig. 10 makes it possible to see that $\alpha$ increases with $h$ and that the variation of $\mathscr{D}$, while preserving compensated induction, can be obtained by maintaining the centre of the correctors at a constant distance from the vertical axis OX of the compass and by imparting thereto a kind of helical movement the law of which, $h=f(\alpha)$, can be experimentally found by measuring for instance through one of the above indicated methods, for every value of $h$ the value of $\mathscr{D}_r$ as a function of $\alpha$, (which makes it possible to find the value of $\alpha$ which corresponds to $\mathscr{D}_r=0$.

I have studied more closely the phenomenon in the vicinity of $\alpha=45°$ with flat circular discs.

It has been found that, while reducing $l_{45°}$ as much as possible, there always remains a $\mathscr{D}_r$ of the same sign as $\mathscr{D}$.

I have tried to make this residual $\mathscr{D}_r$ equal to zero by means for instance of a longitudinal bar disposed horizontally along the bisector of the angle $\beta$ of Fig. 7.

If $\mathscr{D}_r$ is thus reduced to zero owing to this additional element for $\alpha=45°$, it is then easy to obtain a quadrantal corrector of the compensated induction type which varies continuously from value $\mathscr{D}=0$ and the dimensions of which are small.

I choose two identical correctors, for instance two discs of a radius equal to $r$. They are placed at a distance $h$ such that, when the discs are disposed as indicated in Fig. 5 ($\alpha=0$), I substantially obtain, for (11) $l=1.1(h+0.505r)$, the maximum value of $\mathscr{D}$ that the correctors must be capable of correcting ($\mathscr{D}$ being substantially given by (13)).

Now, without changing $h$, the discs are placed in the position $\alpha=45°$ ($\beta=90°$ Fig. 7).

$l_{45°}$ is adjusted to a value close to that given by Formula (11) and the residual $\mathscr{D}_r$ is made equal to zero, as above indicated, by means of a supplementary corrector, for instance a longitudinal bar disposed along the bisector of angle $\beta$.

It is then possible, for every value of $\alpha$, to determine the value $l_\alpha$ which corresponds to $\mathscr{D}_r=0$.

Thus I experimentally determine the law of movement $l_a(\alpha)$ of the corrector which makes it possible, without changing $h$ and without displacing the additional bar, to vary $\mathscr{D}$ between 0 and its maximum value while always keeping $\mathscr{D}_r=0$. I thus obtain a quadrantal corrector with a continuous variation of the amplitude of the corrected deviation and of the compensated induction type, that is to say a corrector making it possible to obtain a final compensation of the quadrantal deviation.

Of course it is also possible to keep the values of $l$ and $h$ constant provided that the position of the additional bar which makes $\mathscr{D}_r$ equal to zero is adjusted according to the value of $\alpha$.

Finally it is possible, as it will be shown hereinafter, to obtain the variation of $\mathscr{D}$ between 0 and $\mathscr{D}$ maximum by merely varying $\alpha$, without changing $l$ and $h$ and without moving the additional bar.

It can be felt and experience confirms this, that the addition of a longitudinal bar increases $l_a$ more for high values of $\alpha$ (close to 45°) than for small values thereof. The conchoid which is the locus of centre $O_a$ becomes close to a circle having its centre at O when the effect of the additional bar is gradually increased from zero value. This is conducive to trying to find a position of the additional bar such that the distance of the correctors to the axis OX that corresponds to a total $\mathscr{D}_r$ equal to zero is the same for $\alpha=0$ and for $\alpha=45°$. Variation of the corrected deviation $\mathscr{D}$ will then be obtained merely by rotating the correctors about the point where their plane intersects axis OX without changing the direction of the bisector of angle $\beta$.

In order to determine this position I may operate as follows:

The correctors are disposed at an angle $\beta=180°$ from each other ($\alpha=0$) (Fig. 5).

$N_r$ (or $\mathscr{D}_r$) is measured as a function of different values of $l$. This makes it possible to trace curve $\alpha=0$ of Fig. 11.

The correctors are then arranged at an angle $\beta=90°$ to each other ($\alpha=45°$) by proceeding as indicated by Fig. 7 and without changing $h$. I likewise determine the curve of the values of $N_r$ (or $\mathscr{D}_r$) that corresponds to $\alpha=45°$ of Fig. 11.

The two curve branches intersect at a point T. The abscissa of point T gives the distance $l$ at which it is necessary to place the two correctors from vertical axis OX. The ordinate of this point indicates the value $\mathscr{D}_r$ that the fixed additional bar is to correct.

If I operate in this way I obtain a compensated induction device for correcting the quadrantal deviation, that is to say a device such that the correction is correct for all locations and the amplitude adjustment requires only the rotation of the two correctors through the same angle $\alpha$ about the point where the horizontal plane of symmetry of the correctors intersects the vertical axis OX which passes through the centre O of the compass card magnets. The construction of such a system is very simple.

Experience shows that $\mathscr{D}_r$, which is equal to zero in the construction that corresponds to this example for $\alpha=0$ and for $\alpha=45°$, is also zero for any value of $\alpha$ ranging from 0 to 45°.

On the other hand, experience also shows that, since the additional bar produces nearly exclusively a $\mathscr{D}_r$, $\mathscr{D}\alpha$ is substantially equal to $$\mathscr{D}\alpha = \mathscr{D}_{\alpha=0} \times \cos 2\alpha$$

It is therefore easy to determine the graduations of the quadrantal compensation device made according to this embodiment.

Figs. 12 and 13 show in plan view and in elevational view how such a device can be constructed.

12 is a spindle made of a non-magnetic metal which is fixed at its upper part to the cup-shaped member (not shown) which contains the magnets of the compass card, on the vertical axis thereof.

13 and 14 are two non-magnetic supports (copper, brass, aluminium) engaged on spindle 12 about which they are rotatable and on which are fixed the discs 5 and 6 of a magnetic substance which constitute the quadrantal correctors (they have been shown by way of example in the form of discs of revolution).

15 and 16 are two non-magnetic arms forming with 13 and 14 a hinged parallelogram. They are provided with a hole through which extends a knob 8 which also passes through a slot 9 provided in arm 10. This knob makes it possible to fix the parallelogram at the point of the slot of arm 10 which corresponds to the quadrantal deviation which is to be corrected.

Arm 10 engaged on spindle 12 extends on the other side of this spindle and carries the additional bar 7 of a magnetic substance.

Finally the whole is rotatable about spindle 12 so as to make it possible to correct any quadrantal deviations. As a matter of fact it is known that, if $\mathscr{E}=0$, arm 10 must be parallel to the longitudinal axis of the ship; if $\mathscr{E} \neq 0$, arm 10 must make with the longitudinal axis of the ship an angle $$\psi = \frac{1}{2} \text{ arc } tg \frac{\mathscr{E}}{\mathscr{D}}$$

Up to now it has been supposed that the diametral plane of the correctors is parallel to the horizontal plane in which the compass card magnets are moving. In order to obtain this, despite the movements of the vehicle, several arrangements may be used. I will cite two by way of example.

(a) The magnets of the compass card are mounted between two pivots and are therefore fixed with respect to the vehicle. The correctors are then fixed with respect to the casing which supports the compass. The deviations of the compass which would result from inclinations of the vehicle are corrected by an inclination corrector either of a magnetic kind (vertical magnet held in a Cardan supporting system), or of the electromagnetic type (circuits producing in the plane of the magnets a field proportional to the sine of the angle of inclination of the vehicle, owing to a potentiometer the movable contact of which is pendularly connected with the vertical).

(b) The compass card magnets, suspended between two pivots or on a single pivot, are placed in a cup-shaped member, itself held by a Cardan system. If the correctors are fixed to this cup-shaped member, they will remain parallel to the magnets even when the vehicle is moving.

But it is known that, in the conventional arrangements including spheres or ellipsoids having their centre in the horizontal plane of the compass card magnets, the correctors are fixed on a casing whereas the compass card is generally in a cup-shaped member suspended through a Cardan system.

Such an arrangement (compass in a cup-shaped member suspended by means of a Cardan system and correctors fixed on a casing) can also be used with compensated induction correctors made according to my invention, as it will now be shown, when use is made of two identical correctors which are symmetrically disposed with respect to the vertical axis of symmetry of the compass. It has been seen (Formula 7 where $$\frac{\delta U}{\delta l}$$

is replaced by its mean value $$\frac{U_A - U_B}{AB})$$

that compensated induction is obtained by disposing the correctors in such manner that:

$$\frac{U_A - U_B}{AB} = \sqrt{\frac{k_2}{k_1}} \frac{U_{o_1}}{l} \text{ (Figs. 1 and 2)}$$

If it is supposed (Fig. 14) that the vehicle is inclined by an angle $\eta$ about a longitudinal axis, the vertical passing through O becomes OX; the compass card magnets which remain horizontal, are directed along OY.

$$\frac{U_{o_1}}{l} = \frac{M}{\overline{OO_b}^3}$$

does not change.

The coordinates of point A, which, in the system of axes Ox, Oy fixed with respect to the correctors, were $h$ and $l$, become in system OX, OY:

$$X = h \cos \alpha + l \sin \alpha$$
$$Y = l \cos \alpha - h \sin \alpha$$

As the quadrantal corrector is composed of two symmetrical identical systems, AB having as centre $O_b$ and CD having as centre $O_a$, the compensated induction condition may be written, for upright position:

$$\frac{U_A - U_B}{AB} + \frac{U_D - U_C}{DC} = \sqrt{\frac{k_2}{k_1}} \left( \frac{M}{\overline{OO_b}^3} + \frac{M}{\overline{OO_a}^3} \right)$$

Now, when the vehicle is inclined, the second member does not change and the first member becomes $$\frac{U'_A - U'_B}{\text{proj}_Y AB} + \frac{U'_D - U'_C}{\text{proj}_Y DC} = \frac{U'_A - U'_C + U'_D - U'_B}{AB \cos \eta}$$

$$U'_A = \frac{MY_A}{\overline{OA}^3} = M \frac{l \cos \eta - h \sin \eta}{\overline{OA}^3}$$

$$U'_C = \frac{MY_C}{\overline{OC}^3} = M \frac{-l \cos \eta - h \sin \eta}{\overline{OC}^3}$$

and as $OC = OA$, $$U'_A - U'_C = \frac{2Ml \cos \eta}{\overline{OA}^3}$$

Now, according to Formula 4 of page 19, $$U_A = M \frac{l}{\overline{OA}^3}$$

$$U_C = M \frac{(-l)}{\overline{OC}^3}$$

and as $OA = OC$ $$U_A - U_C = \frac{2Ml}{\overline{OA}^3}$$

Therefore:

$$U'_A - U'_C = (U_A - U_C) \cos \eta$$

Likewise it will be found that $$U'_D - U'_B = (U_D - U_B) \cos \eta$$

Consequently $$\frac{U'_A - U'_C + U'_D - U'_B}{AB \cos \eta} = \frac{U_A - U_C + U_D - U_B}{AB}$$

The first member of the compensated induction condition is therefore also a quantity which does not change and the equality between the two members remains when there is an inclination $\eta$.

An analogous property would be found by calculation if it were supposed that the vehicle is inclined at a small angle about a transverse axis.

The correctors can therefore be fixed to the casing of the apparatus.

Figs. 15 and 16 show an embodiment corresponding to the diagram of Fig. 4.

17 is a casing fixed on the ship and to which the cup-shaped member 18 which supports the magnetic system is suspended through a Cardan joint as in conventional constructions.

3 and 4 are non-magnetic pieces fixed to the casing through two collars (and which can be turned through an angle $$\psi = \frac{1}{2} \text{ arc } tg \frac{\mathscr{E}}{\mathscr{D}}$$

by loosening said collars). They constitute two surfaces, inclined with respect to the vertical at an angle close to 47°30'. On these two surfaces are slidable two brackets 19 and 20 on which are fixed the two magnetic correctors 1 and 2. These correctors may be laminated as hereinafter indicated.

Adjustment of the amplitude of the correction is effected by fixing, for instance by means of bolts such as 21, 22, 23 and 24, the two brackets 19 and 20 at a suitable height which may be determined as a function of $$\sqrt{\mathscr{D}^2 + \mathscr{E}^2}$$

by means of marks made on surfaces 3 and 4.

Obviously I may thus obtain different values of $$\sqrt{\mathscr{D}^2 + \mathscr{E}^2}$$

by making use of pairs of correctors the dimensions of which vary in accordance with the value of the term $$\sqrt{\mathscr{D}^2 + \mathscr{E}^2}$$

to be corrected and the position of which on the bracket is fixed when the apparatus is constructed in accordance with the dimensions of the correctors, the following law being used for instance in the case of circular correctors:

(11) $\quad l = 1.1(h + 0.505r)$

For this purpose, the brackets, such as 19 and 20, may carry projections and the correctors may be provided with holes at suitable places so that the setting in position of these correctors during the compensation operation takes place without possibility of mistake.

In this case I may use either fixed brackets and different sets of correctors, or I may vary simultaneously the choice of the dimension of the correctors and the position of the brackets. This last mentioned solution has the advantage of reducing the number of pairs of correctors that are necessary to cover the whole possible range of the values of $$\sqrt{\mathscr{D}^2+\mathscr{E}^2}$$

If use is made of fixed brackets, it will be possible to use a semi-circular corrector placed in the apparatus casing at point R symmetrically opposite to the centre O of the magnets of the compass card with respect to the horizontal mean plane of the correctors. This semi-circular corrector may be constituted by two similar magnets which can be rotated with respect to each other: the field they produce at the centre O of the compass is parallel to the bisector of the vectors representing the magnetic moments of these two magnets; its intensity is proportional to the cosine of one half of the angle made by the two above mentioned vectors with each other. Such a system may be constituted as shown by Fig. 17. 25 and 26 are the two magnets (for instance two discs magnetized perpendicularly to their axis); each of them is rigid with a toothed wheel (crown gear) 27 for 25, 28 for 26. A toothed wheel 29 meshes with 27 and 28. Rotation of the axis 30 of 29 causes the two magnets to rotate without changing the direction of the resultant of their magnetic moments. It merely changes the amplitude of the field that they produce at O.

The whole is fixed in a box 31 which is placed in the apparatus casing in the position designated by 11 on Fig. 15 so that EF is on the vertical passing through O and the point R is located substantially between the two magnets 25 and 26. Box 31 is provided with an opening 32 which extends 180° and through which passes spindle 30. When spindle 30 is rotated through an angle $\theta_2$ along this opening, the direction of the field produced at O is modified by this semi-circular corrector system by the angle $\theta_2$.

Of course the crown gears 27 and 28 can be replaced by spur gear wheels if 29 is replaced by two toothed wheels having vertical axes and meshing on the one hand with each other and on the other hand one with 27 and the other with 28, the axes of these toothed wheels being further fixed on box 31.

Of course, concerning the quadrantal correctors, there is no need to employ circular discs. In particular if, in order to simplify construction or operation, it is desired to place them at a greater distance from the vertical axis OX which passes through the centre of the compass, it suffices for instance to give them the shape of an ellipse the diameter of which directed toward OX is smaller than the diameter at right angles thereto, which according to the formulas (see column 25, lines 43–45 and 47–49) increases the slope of the two surfaces 3 and 4.

Up to now, no mention has been made of a phenomenon, to wit the magnetic hysteresis of the correctors, which fixes a limit in the reduction of the size of compasses and of their correctors. Due to this phenomenon, when the vehicle is on a given compass heading $\theta'$ the deviations $\delta$ of the compass have not the same value according as the vehicle has come to heading $\theta'$ by turning toward the right (which produces a deviation $\delta_d$) or by turning toward the left (the deviation being then $\delta_g$). If the deviation curves are traced as a function of the compass heading $\theta'$ when turning successively in both directions, the area comprised between the two curves $\delta_d(\theta')$ and $\delta_g(\theta')$ constitutes a range of uncertainty. The compass will be the more reliable as the maximum value of the difference $\delta_d-\delta_g$ is lower.

This hysteresis range depends upon two factors:

(a) The quadrantal correctors: nature of the matter of which they are made, shape, dimensions;

(b) The intensity of the field in which they are placed. I will first examine the second of these factors.

The maximum value of $\delta_d-\delta_g$ is, when other things remain unchanged, a function which increases quickly with the maximum value of the amplitude $H_r$ of the inductor field.

This amplitude is of the form given by the following formula:

$$H_r=\sqrt{\left(\frac{\partial U}{\partial l}\right)^2\cos^2\theta+\left(\frac{U}{l}\right)^2\sin^2\theta}$$

Its maximum value is the greater of the two following values:

$$\left|\frac{\partial U}{\partial l}\right| \text{ and } \left|\frac{U}{l}\right|$$

Now, in order to compensate for a given quadrantal $\mathscr{D}$ correctors of given dimensions, it is necessary, in first approximation, to give a fixed value to the sum $$\left|\frac{\partial U}{\partial l}\right|+\left|\frac{U}{l}\right|$$

It will be seen that, in these conditions, the hysteresis range will be minimum if:

$$\left|\frac{\partial U}{\partial l}\right|=\left|\frac{U}{l}\right|$$

Now it happens that the device according to the present invention complies substantially with this condition.

It will therefore be seen that, from the point of view of accuracy of the indications it supplies, a compass including correctors according to the present invention will be, other things being equal, superior to compasses including correctors disposed according to conventional arrangements.

Concerning the first factor which influences hysteresis, I will review some notions concerning hysteresis curves.

It will be remembered that if a magnetic body is subjected to a uniform external field $ON=\vec{\mathscr{H}}_e$ (Fig. 18), then due to the magnetic masses distributed on the surface of the body, the internal field is generally neither uniform nor parallel to $\vec{\mathscr{H}}_e$, but has, at a given point of solid, a value $OM=\mathscr{H}_i$, and the corresponding intensity of magnetization is ordinate $MJ=\mathscr{J}$.

If $\mathscr{H}_e$, while keeping the same direction with respect to the magnetic body, varies between two symmetrical values $+\mathscr{H}_m$ and $-\mathscr{H}_m$, point J describes a curve called a hysteresis cycle. As for angle MJN, it is substantially constant and it depends upon the shape of the magnetic body and its magnetic permeability $\chi$.

It will be seen that, for a given external field $\mathscr{H}_e$, the magnetization $\mathscr{J}$ has two values $J_1M_1$ or JM according as the field has come to value $\mathscr{H}_e$ by increasing or by decreasing.

These differences produce differences $$\delta_d-\delta_g$$

I will first consider an elongated quadrantal corrector, that is to say one such that the component of the field that is parallel to the longer axis produces a substantial effect.

If I study as a function of heading $\theta'$ the difference $h(\theta')=\delta_d-\delta_g$, it is possible to decompose $h(\theta')$ in a Fourier series and it is found that $h(\theta')$ includes:

A constant term (A).

A semi-circular term (S) which is relatively unimportant.

A quadrantal term (Q) at a phase difference of $$\frac{\pi}{2}$$

with respect to the useful quadrantal produced by the corrector.

While the constant term corresponds to a consumption of energy and is therefore proportional to the area of the hysteresis cycle, the other terms depend upon the shape of the curve and upon the slope of straight line JN.

What is important as a rule in hysteresis phenomena such as are considered in electrotechnics is the value of the losses, that is to say the area of a hysteresis loop curve for a given maximum magnetization and it is this area which is to be reduced to a minimum in the so-called low loss magnetic bodies.

In the present case, what is chiefly important is to reduce as much as possible the maximum of curve $h(\theta')$, the value of which maximum is close to $|A|+|Q|$, which result is approximately obtained for $\mathcal{H}e=0$.

Suitable results are obtained by making use of magnetic materials of average permeability (about 1.000) substantially constant within the field of variation of $\mathcal{H}_1$, such as wrought iron or ferrites.

Experience has also taught that it is advantageous, when use is made of metallic bodies, to use thin metal sheets (the thickness of which ranges from some tenths of a millimeter to 1 mm.) between which are provided nonmagnetic plates, for instance brass plates. It should be noted that in this case the phenomenon is not the same as that taking place in conventional electrotechnics where magnetic sheets are laminated to reduce Foucault current losses. As a matter of fact, in the present case, the body which separates the magnetic sheets from one another may without any disadvantage be a conductor such as brass. The only condition required from this body is that it be non-magnetic.

I may also make use of an insulating body but a metal is preferable because it makes it possible to subject the corrector, after it has been manufactured, to a heating operation which improves the magnetic qualities thereof, both from the point of view of the magnetic susceptibility and from that of curve $h(\theta')$.

I found that this heating decreases the value of Q still more than it reduces that of A, and is therefore particularly interesting in the case of quadrantal correctors, whereas in conventional electrotechnics, A is a coefficient more interesting than Q.

Finally, in the present case, this laminating reduces the apparent magnetic susceptibility of the corrector, that is to say the slope of a straight line extending between points O and J (Fig. 18). If use is made of the same amount of magnetic material, while increasing by means of brass plates the thickness of the whole, the value of angle MJN is increased and, consequently, a reduction of the length of segments $JJ_1$ is obtained.

What precedes also applies to the general case of a corrector of any shape whatever.

However, the component of the field produced by the compass card magnet parallel to the plane OX, $OO_1$ and the component perpendicular to this plane both give birth, due to hysteresis, to differences $\delta_d - \delta_x$ which are periodical functions $h(\theta')$ the quadrantals of which functions subtract from each other (whereas terms $a$ are added to each other).

If use is made of perfectly homogeneous and magnetically isotropic correctors having the shape of bodies of revolution and disposed in such manner that by themselves they have a compensated induction, that is to say do not require the use of a supplementary bar, of course only term A remains. It has been seen above that for a given corrector and a given quadrantal deviation, it is this arrangement which gives the minimum amplitude of the deviation.

It should therefore seem that there is no advantage, in the case of compensated induction correctors according to my invention, to make use of laminated sheets since there only remains the hysteretic deviation due to energy losses and the laminating arrangement has no substantial effect upon these losses.

However it is of interest to make use of laminated structures for several reasons.

In particular:

Metal sheets obtained by rolling are not isotropic. Their magnetic characteristics are not the same in the direction in which they have undergone rolling as in the direction at right angles thereto, and this even after reheating.

When making use of a laminated structure and superimposing rolled metal sheets in such manner that the directions of rolling of two successive sheets are perpendicular to each other, isotropy is improved and the quandrantal of the function $h(\theta)$ is further reduced; instead of superimposing two metal sheets the rolling directions of which are at 90°, it is possible to superimpose four sheets the rolling directions of which are at 45°, which reduces both the quadrantal and the semi-circular terms of function $h(\theta')$.

Reheating in the mass gives better results when applied to laminated sheet correctors than in the case of homogeneous correctors.

The relation $$\left|\frac{\partial U}{\partial l}\right|=\frac{U}{l}$$

(Formula 7 where it is assumed that $k_2=k_1$) is not exactly obtained at all points of the correctors; likewise, when an additional bar is used, I obtain $$\frac{\partial U}{\partial l} \neq \frac{U}{l}$$

Hysteresis being not a linear function of the fields that are applied, there would remain a small hysteresis quadrantal, even if the mean value of $$\left|\frac{\partial U}{\partial l}\right|$$

were equal to that of $$\left|\frac{U}{l}\right|$$

Finally, it is known that if the corrector has a volume V and a maximum magnetization $\mathscr{J}$, the quandrantal $\mathscr{Q}$ it produces is proportional to $\mathscr{J}V$ whereas the losses and therefore, in particular, coefficient A are proportional to V. $\mathscr{J}^a$ with $a>1$. A will be reduced, for a given value of $\mathscr{Q}$, by increasing V.

If the volume of the corrector is increased by increasing its thickness, lamination will make it possible to keep the effect of the vertical induction of the field negligible.

Finally this laminated arrangement is very useful for the additional bar when such a bar is used, because for this bar only the effect of the longitudinal field exists and there are no longer two functions $h(\theta')$, the quadrantal and the semi-circular terms of which subtract from each other, but only one function $h(\theta')$ which includes a quadrantal and a semi-circular term which it is therefore advantageous to reduce as much as possible.

The use of such laminated correctors is one of the features of my invention.

Up to the present time, no mention has been made of the effect of the corrector called Flinders bars. This is in general a soft iron corrector in the form of a vertical bar. If it is placed in a vehicle equipped with the compass in the longitudinal plane of the vehicle passing through the vertical axis OX of the compass, this bar produces, under the effect of the vertical component Z of the earth's field, a semi-circular deviating field, proportional to Z, and therefore of the form $c_1Z$, which is parallel to the portion λH $\mathscr{B}$ of the semi-circular term in the equation given at the beginning of this specification. It is intended to reduce to zero the component $cZ$ of λH $\mathscr{B}$, component P defined in connection with said equation being reduced to zero by a magnet.

But this soft iron bar is also magnetized under the action of the compass card magnets, producing a pseudo-quadrantal deviation of the same nature as $\mathscr{D}_r$ and which therefore has an amplitude inversely proportional to the horizontal component of the earth's magnetic field.

It may be endeavoured to eliminate this effect by experimentally seeking, by one of the above indicated methods, for every length of the Flinders bar and for every value of the quadrantal to be corrected, the relation between parameters $l$, $h$ and $\alpha$ which makes it possible to eliminate $\mathscr{D}_r$ resulting from the action of the compass card magnets on the whole of the soft iron correctors (quadrantal correctors and Flinders bar) and to establish a table which will make it possible, in order to achieve compensation, correctly to place the whole of the soft iron correctors according to the values of coefficients $\mathscr{D}$, $\mathscr{E}$ and $c$, which permits of obtaining a compensation independent of the magnetic latitude.

However, with this method, a single control of the quadrantal corrector, which is one of the objects of the invention, is no longer possible.

This is why the single Flinders bar is preferably replaced, as disclosed in the British Patent No. 205,339, by two identical parallel bars, placed at the same height and at the same distance with respect to the centre of the magnets of the compass card and in such manner that the dihedral angle formed by the vertical axis OX passing through the centre O of the compass and respectively by each of the two axes of the bars is a right angle dihedral angle. With such an arrangement, the Flinders bars produce no quadrantal or pseudo-quadrantal deviation and their presence does not change the arrangement of the quadrantal correctors corresponding to $\mathscr{D}_r=0$.

This arrangement gives $\mathscr{D}_r=0$ for the Flinders bars whereas an analogous arrangement did not give $\mathscr{D}_r=0$ for the quadrantal correctors. This fact may seem surprising, but it should be remembered that the horizontal section of these bars is small with respect to the distance between them (contrary to what takes place for the quadrantal correctors) and consequently their mutual induction, which varies very quickly with the distance, can be neglected whereas this could not be done in the case of quadrantal correctors the horizontal section of which is very great and which, for position $\alpha=45°$, corresponding to $\mathscr{D}=0$ (Fig. 7) are very close to each other.

In the case of semi-circular correctors, to vary the amplitude of the semi-circular deviation to be corrected while avoiding pseudo-quadrantal deviations due to the magnetism induced in these semi-circular correctors by the field of the compass card needle system, I may use some of the systems described with reference to quadrantal correctors, for instance under (a), (b) and (c) following Equation 13.

I may also use a special system as illustrated by Fig. 19.

Discs 33 and 34, having their centres at $O_a$ and $O_b$ respectively, are magnetized in a uniform fashion and at right angles to their axes, so that the respective magnetic moments of these two magnets are substantially equal to each other. Disc 33 is rigid with a toothed wheel carried by a part 35. Disc 34 is adjustable in height with respect to a part 36 carrying a toothed wheel, without being able to rotate with respect to said toothed wheel, whereby it is possible to adjust the fields produced at O by the two magnets so that said fields are equal to each other. Both of said toothed wheels mesh with a worm 37.

If, starting from an initial position of the discs for which the magnetization of the two discs are parallel, of the same direction and perpendicular to line $O_aO_b$, worm 37 is rotated, discs 33 and 34 turn through the same angles in opposed directions. The value of the semi-circular deviation field that is produced then varies progressively from its maximum value to zero without variation of the direction.

It is possible to adjust said phase by turning the whole of the system, with respect to guiding means 38 which may be constituted by the upper glass plate of the compass, about axis OX. This system, placed in a casing 39, makes it possible to obtain a semi-circular deviation field of any amplitude and any direction, and consequently to compensate for the semi-circular deviations caused by the magnetic field.

In order to prevent the semi-circular corrector system from influencing the quadrantal corrector system, these two systems may be placed respectively on opposite sides of the compass card magnets. For instance, casing 39 may be positioned as shown by Fig. 15.

In the case of the semi-circular corrector system, $r$ may be chosen much smaller than $h$ (for instance $r=2$ mm., $h=20$ mm.). Therefore the center $S'_c$ of the cone on which the centers of the correctors of the system are located will be close to point O and $l$ substantially equal to $1.1\,h$.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A magnetic compass apparatus which comprises, in combination, a casing, a compass card pivotally mounted in said casing about a vertical axis, a magnetic needle system fixed to said compass card, two identical correctors, said correctors being made of a magnetic material and having an apparent magnetic permeability lower in the direction of said axis than in directions at right angles to said axis, said correctors having a common mean horizontal plane which is distinct from the horizontal plane of said needle system, and guiding means carried by said casing for positioning said correctors symmetrically with respect to a vertical plane passing through said axis and for adjustably holding corresponding points of said correctors respectively on two curves defined by said means and symmetrical with respect to said vertical plane, said guiding means being such that, for all positions, in said common plane, of said correctors with respect to said casing made possible by said guiding means, the pseudo-quadrantal deviating effects on said needle system of the fields produced at the center of said compass card by the magnetization induced in said correctors by said needle system have a resultant in the horizontal plane of said center which is at least substantially equal to zero, whereby it is possible, by displacing said correctors along said guiding means, to adjust their own correcting effect without introducing any detrimental pseudo-quadrantal deviating horizontal resultant capable of acting on said needle system.

2. A magnetic compass apparatus which comprises, in combination, a casing, a compass card pivotally mounted in said casing about a vertical axis, a magnetic needle system fixed to said compass card, two identical quadrantal correctors for compensating the quadrantal deviation due to the horizontal component of the earth's magnetic field, said correctors being made of a magnetic material and having an apparent magnetic permeability lower in the direction of said axis than in directions at right angles to said axis, said correctors having a common mean horizontal plane which is distinct from the horizontal plane of said needle system, and guiding means carried by said casing for positioning said correctors symmetrically with respect to a vertical plane passing through said axis and for adjustably holding corresponding points of said correctors respectively on two curves defined by said means and symmetrical with respect to said vertical plane, said guiding means being such that, for all positions, in said common plane, of said correctors with respect to said casing made possible by said guiding means, the pseudo-quadrantal deviating effects on said needle system of the fields produced at the center of said compass card by the magnetization induced in said correctors by said needle system have a resultant in the horizontal plane of said center which is at least substantially equal to zero, whereby it is possible, by displacing said correctors along said guiding means, to adjust their quadrantal correcting effect which then remains effective irrespective of latitude variations without introducing any detrimental pseudo-quadrantal deviating horizontal resultant capable of acting on said needle system.

3. A magnetic compass apparatus according to claim 2 in which said quadrantal correctors are constituted by a plurality of superimposed magnetic rolled metal sheets, the respective directions in which the successive sheets have been rolled being crossed.

4. A magnetic compass apparatus according to claim 2 further including semi-circular correctors in the form of bodies of revolution about respective vertical axes, the centre of each of said correctors being located substantially on a cone of revolution the axis of which coincides with said vertical axis, the apex of which is on the other side of the compass card from said semi-circular correctors at a distance from the compass card magnets equal to one half of the radius of said correctors, and the apex half angle of which is substantially equal to 47° 30'.

5. A magnetic compass apparatus according to claim 2 in which said quadrantal correctors are constituted by a plurality of superimposed magnetic rolled metal sheets, the respective directions in which the successive sheets have been rolled being crossed, with plates of a non-magnetic substance interposed between said sheets.

6. A magnetic compass apparatus which comprises, in combination, a casing, a compass card pivotally mounted in said casing about a vertical axis, at least one magnet fixed to said compass card at right angles to said axis, two identical quadrantal correctors for compensating the quadrantal deviation due to the horizontal component of the earth's magnetic field, said correctors being made of a magnetic material and having a common mean horizontal plane which is distinct from the horizontal plane of said magnet, and guiding means carried by said casing for positioning said correctors symmetrically with respect to said vertical axis and for adjustably holding corresponding points of said correctors respectively on two curves defined by said means and symmetrical with respect to said vertical axis, such that when the vertical distance between the horizontal plane of said magnet and said mean horizontal plane of said correctors is varied, the horizontal distance between said vertical axis and each of said correctors is varied simultaneously and in such manner that the deviating effects on said magnets of the fields produced at the center of said compass card by the magnetizing effects induced in said correctors by said magnet have a resultant in the plane of said center which is equal to zero and therefore produce no deviation of the compass card whatever be the direction thereof about said axis with respect to said correctors.

7. A magnetic compass apparatus which comprises, in combination, a casing, a compass card pivotally mounted in said casing about a vertical axis, at least one magnet fixed to said compass card at right angles to said axis, two identical quadrantal correctors of a magnetic material for compensating the quadrantal deviation due to the horizontal component of the earth's magnetic field, said correctors having an apparent magnetic permeability lower in the direction of said axis than in directions at right angles to said axis, means carried by said casing for movably supporting said correctors pivotally about said axis and with their common mean horizontal plane distinct from the horizontal plane of said magnet, means for holding said correctors symmetrical of each other with respect to a bisector plane passing through said vertical axis, said two last mentioned means being arranged to permit adjustment of said correctors between two limit positions for one of which the dihedral angle formed by two planes passing both through said vertical axis and each respectively through the center of one of said correctors approximates 180° and for the other of which said dihedral angle approximates 90°, the distance from the centers of said correctors to said vertical axis being determined relatively to the vertical distance between the horizontal plane of said magnet and said common mean horizontal plane of said magnets so that for both of said limit positions of said correctors the deviation effect exerted by said correctors on said magnet as a result of the magnetizing of said correctors by the field of said magnet is substantially the same and is of small value, and a metal bar located in said bisector plane calculated to eliminate said deviation effect.

8. A magnetic compass apparatus which comprises, in combination, a casing, a compass card pivotally mounted in said casing about a vertical axis, a magnetic needle system fixed to said compass card, two identical quadrantal correctors in the form of bodies of revolution about respective axes, said correctors being made of a magnetic material and being substantially isotropic in all horizontal directions, said correctors having an apparent magnetic permeability lower in the direction of said axis than in directions at right angles thereto, said correctors having a common mean horizontal plane which is distinct from the horizontal plane of said needle system, and guiding means carried by said casing for keeping the respective centers of said quadrantal correctors at least substantially on a cone of revolution the axis of which coincides with said vertical pivot axis of said compass card, the apex of which is located on the other side of the compass card from the correctors, at a distance from the compass card magnets substantially equal to one half of the radius of said quadrantal correctors and the apex half-angle of which is substantially equal to 47°30', whereby, for all positions of said correctors with respect to said casing made possible by said guiding means, the pseudo-quadrantal deviating effects on said needle system of the fields produced at the center of said compass card by the magnetization induced in said correctors by said needle system have a resultant in the horizontal plane of said center which is at least substantially equal to zero, and it is possible by displacing said correctors along said guiding means to adjust their quadrantal correcting effect which then remains effective irrespective of latitude variations, without introducing any detrimental pseudo-quadrantal deviating horizontal resultant capable of acting on said needle system.

References Cited in the file of this patent

UNITED STATES PATENTS

| 551,295 | Sirieix | Dec. 10, 1895 |
| 2,020,905 | Robert | Nov. 12, 1935 |

FOREIGN PATENTS

| 258,664 | Germany | Apr. 16, 1913 |
| 205,339 | Great Britain | Oct. 18, 1923 |
| 713,796 | Germany | Nov. 19, 1941 |
| 970,703 | France | June 21, 1950 |